United States Patent [19]

Watanabe et al.

[11] 4,414,496

[45] Nov. 8, 1983

[54] ELECTRONIC TYPEWRITER AND ITS CONTROL APPARATUS

[75] Inventors: Tomoyoshi Watanabe, Chiryu; Takanobu Hirayama, Chita; Motokazu Yoshimura, Nagoya; Kenji Mizuno, Nagoya; Yukio Inukai, Nagoya, all of Japan

[73] Assignee: Brother Industries, Ltd., Nagoya, Japan

[21] Appl. No.: 204,675

[22] Filed: Oct. 27, 1980

Related U.S. Application Data

[62] Division of Ser. No. 13,329, Feb. 21, 1979, abandoned.

[30] Foreign Application Priority Data

Mar. 7, 1978 [JP] Japan ................................ 53-25856

[51] Int. Cl.[3] ........................................ H02K 29/04

[52] U.S. Cl. .................................. 318/696; 318/685; 400/163

[58] Field of Search .................... 101/93.17; 400/163, 400/163.1, 163.2, 154.5; 318/685, 696, 717, 601, 603

[56] References Cited

U.S. PATENT DOCUMENTS

| | | | |
|---|---|---|---|
| 3,328,658 | 6/1967 | Thompson | 318/138 |
| 3,636,429 | 1/1972 | Jakubowski et al. | 318/685 |
| 3,746,958 | 7/1973 | Leenhouts | 318/696 |
| 4,025,837 | 5/1977 | Meier et al. | 318/561 |

*Primary Examiner*—J. V. Truhe

*Assistant Examiner*—Saul M. Bergmann

*Attorney, Agent, or Firm*—George B. Oujevolk

[57] ABSTRACT

An electronic typewriter comprising: a keyboard having a plurality of keys and generating an encoded signal in response to the depression of each key; a printing unit having a print wheel with a plurality of type elements disposed around the periphery thereof, a step motor for rotating the print wheel, a print hammer for impacting the type element brought to a printing position, an ink ribbon, and a ribbon drive mechanism for bringing the ink ribbon to the printing position; and an electronic control circuit for coupling the keyboard to the printing unit. The electronic control circuit controls the rotation of the step motor according to the encoded signal received from the keyboard so as to bring a type element selected by the encoded signal to the printing position within a short time for executing quicker printing, and further controls the action of both the print hammer and the ribbon drive mechanism in response to the rotation of the step motor.

1 Claim, 33 Drawing Figures

ELECTRONIC TYPEWRITER AND ITS CONTROL APPARATUS

This is a division of application Ser. No. 13,329, filed Feb. 21, 1979.

BACKGROUND OF THE INVENTION

1. Field of the Invention

The present invention relates to a novel electronic typewriter of excellent quality capable of electronically controlling the action of a print head according to signal obtained from a keyboard.

2. Description of the Prior Art

Typewriters are classified into two kinds: one is manual type that entire components of mechanisms are connected with one another mechanically, and manual operation of each key on a keyboard is coupled directly to the striking action of a type bar; and the other is the electric typewriter wherein a drive motor is provided, and each of the type bars relating to keys is driven by a snatch roll coupled directly to the motor.

In comparison of these two types, the former is disadvantageous in the point of requiring skill to depress each key with uniform force, while the latter has disadvantages in the increase of weight and production cost resulting from the provision of a drive motor, a snatch roll and other components related thereto. And even these mechanical typewriters are also equipped with a multiplicity of components including key levers, bell cranks, type bars and type-bar-wires for individual keys, hence requiring highly advanced technology in manufacture and rendering the structure bulky beyond convenient portability.

One of the prior art typewriters which suggest a partial solution of such problems in the conventional typewriters is disclosed in the U.S. Pat. No. 3,954,163, which describes a high-speed printer wherein the principal part of the printing mechanism comprises a single print wheel with a plurality of type elements disposed around the periphery thereof and a single print hammer for impacting the type elements. However, a DC motor to be driven under complicated control is employed therein for rotating the print wheel, and in the entirety of the mechanism, there exist some components not directly applicable to the typewriter.

SUMMARY OF THE INVENTION

The principal object of the present invention is to provide a typewriter capable of solving the aforementioned problems with the employment of electronic means for digitally controlling the action of entire mechanisms. More particularly, it is an improved electronic typewriter having a simplified, lightweight structure and being manufacturable with facility, wherein a single print wheel is equipped with a plurality of type elements disposed around the periphery thereof, and the print wheel is rotated by a digitally controllable step motor in response to the operation of a keyboard so that the type element corresponding to a depressed key is struck by a print hammer.

Another object of the present invention is to provide an electronic typewriter with an intensive driving source, wherein a print head equipped with a print wheel, a step motor and a print hammer is incrementally moved relative to a platen by means of a single drive motor, which also functions to lift an ink ribbon to a printing position.

A further object of the present invention is to provide an electronic typewriter wherein, for achieving efficient execution of the printing action, the rotation of a rotor of a step motor and the timing for driving a print hammer and an ink ribbon are controlled by an electronic control circuit in accordance with the angle of rotation of the step motor required for bringing to a printing position the type element selected on a print wheel by an encoded signal from a keyboard.

And it is still a further object of the present invention to provide a rotation control circuit for driving the step motor quickly and stopping the same at a destinating position with accuracy.

In a preferred embodiment according to the present invention, a print head consists of the print wheel with type elements disposed around the periphery thereof, a step motor for rotating the print wheel, and a print hammer for selectively impacting one of the type elements. The print head is loaded with an ink ribbon, and a ribbon drive mechanism is equipped with a lift mechanism for lifting the ink ribbon to a printing position and a feed mechanism for feeding the ink ribbon sequentially. And a single drive motor fixed on a frame applies driving force for moving the print head along a platen and also for actuating each of the ribbon lift mechanism and the ribbon feed mechanism. Moreover, according to an encoded signal obtained from the keyboard, the electronic control circuit controls rotation of the rotor of the step motor, motion of the print hammer and connection between the ribbon drive mechanism and the drive motor. The rotation of the rotor of the step motor is controlled in two ways in accordance with the required rotation angle thereof. That is, in one case where such rotation angle is small, the rotor of the step motor is rotated at a constant low speed, while in the other case where the angle is large, the rotor of the step motor is rotated in an acceleration-deceleration stroke divided into three ranges of acceleration, deceleration and constant low speed immediately before stop. In the former case, the ink ribbon is driven simultaneously with the start of the driving of the step motor, and the print hammer is driven when the ink ribbon is lifted to the printing position. And in the latter case, the ink ribbon is driven in the midway of driving the step motor, and the print hammer is driven when the ink ribbon is lifted with the timing of stopping the motor.

DESCRIPTION OF THE PREFERRED EMBODIMENT

Figure 3:
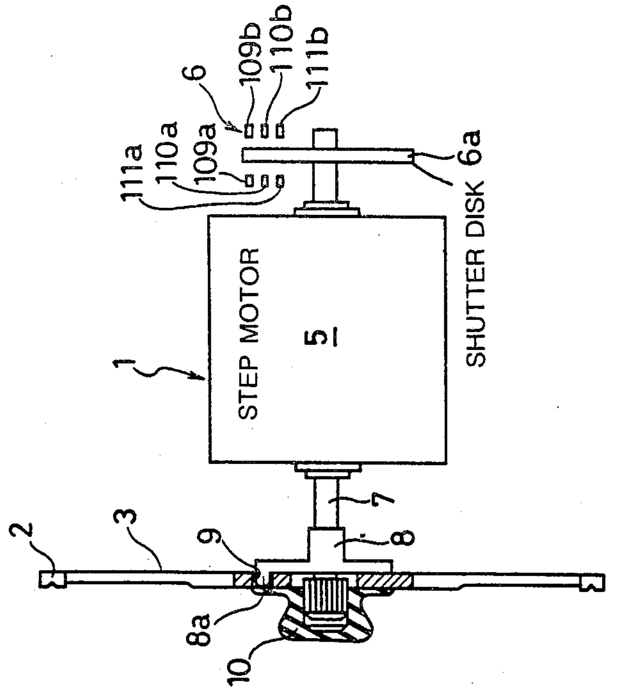
FIG. 3 is a partly sectional view showing how a print wheel and a detector are attached to a step motor.

To begin with, the outline of the embodiment will be described with reference to FIGS. 1A through 4. A print heat 1 comprises a print wheel 3 having a plurality of type elements 2 composed of NYLON containing glass fiber 30 percent or of DURACON (trade name of Polyplastics Co., Ltd.) containing glass fiber 30 percent, a step motor 5 connected to the print wheel 3 directly for rotating the same within a plane parallel with a platen 4, and a detecting device 6 for sensing the rotational position of the print wheel 3. Connection between the print wheel 3 and the step motor 5 is positioned, as shown in FIG. 3, when a projection 8*a* on a positioning member 8 secured to one end of a rotor shaft 7 of the step motor 5 is engaged with an opening 9 formed in the print wheel 3, which is held by the positioning member 8 and a rubber cap 10 for fixing. The entire print wheel 3 is divided into 96 parts in the circumferential direction thereof and is constituted of 88 type elements 2 and an aperture 11 corresponding to 8 type elements. Due to the provision of the aperture 11, printed letters 12 are rendered visible on paper P supported on the platen 4 when the print wheel 3 is at its home position shown in FIG. 1A. The detecting device 6 comprises, as illustrated in FIG. 3, a shutter disk 6*a* secured to the other end of the rotor shaft 7 of the step motor 5, and three detectors 109, 110 and 111 disposed opposite to the shutter disk 6*a*. Each of the detectors 109 consists of a light emitting diode 109*a*, 110*a* or 111*a* and a photosensitive transistor 109*b*, 110*b* or 111*b* which forms a pair with the diode related thereto individually. The diodes and the transistors are disposed opposite to each other through the shutter disk 6*a*, on which a slit (not shown) related to the home position of the print wheel 3 is formed for the detector 109 and also slits 96 (not shown) related to the respective positions of the type elements 2 and the aperture 11 on the print wheel 3 are formed for the detectors 110 and 111. The detecting device 6 is so constructed that detection signals obtained from the photosensitive transistors 110*b* and 111*b* of the detectors 110 and 111 with rotation of the shutter disk 6*a* have a 90-degree phase difference to each other.

The print head 1 of such a structure is attached to a head support 14 held pivotally mounted on a head base 13, which is guided by a guide bar 15 rotatably on a frame (not shown) and also by a guide plate 16 secured to the frame (not shown) so as to be movable linearly in parallel with the platen 4. An ink ribbon cartridge support 17 is held at the upper end of the head support 14 in the manner to be pivoted loosely around a base portion 17*a* thereof, and an ink ribbon cartridge 18 is secured to the cartridge support 17. An ink ribbon 20 exposed between arm portions 19 and 19 of the ink ribbon cartridge 18 is set between the paper P and the print wheel 3, and normally is positioned below the aperture 11 of the print wheel 3 so as to render visible the letters 12 printed on the paper P. And when driven by a ribbon lift mechanism (which will be described afterward), the ink ribbon 20 is lifted upward to a printing position. Since the ribbon cartridge 18 is of a known type housing an endless ink ribbon therein, a detailed explanation is omitted.

Figure 1A:
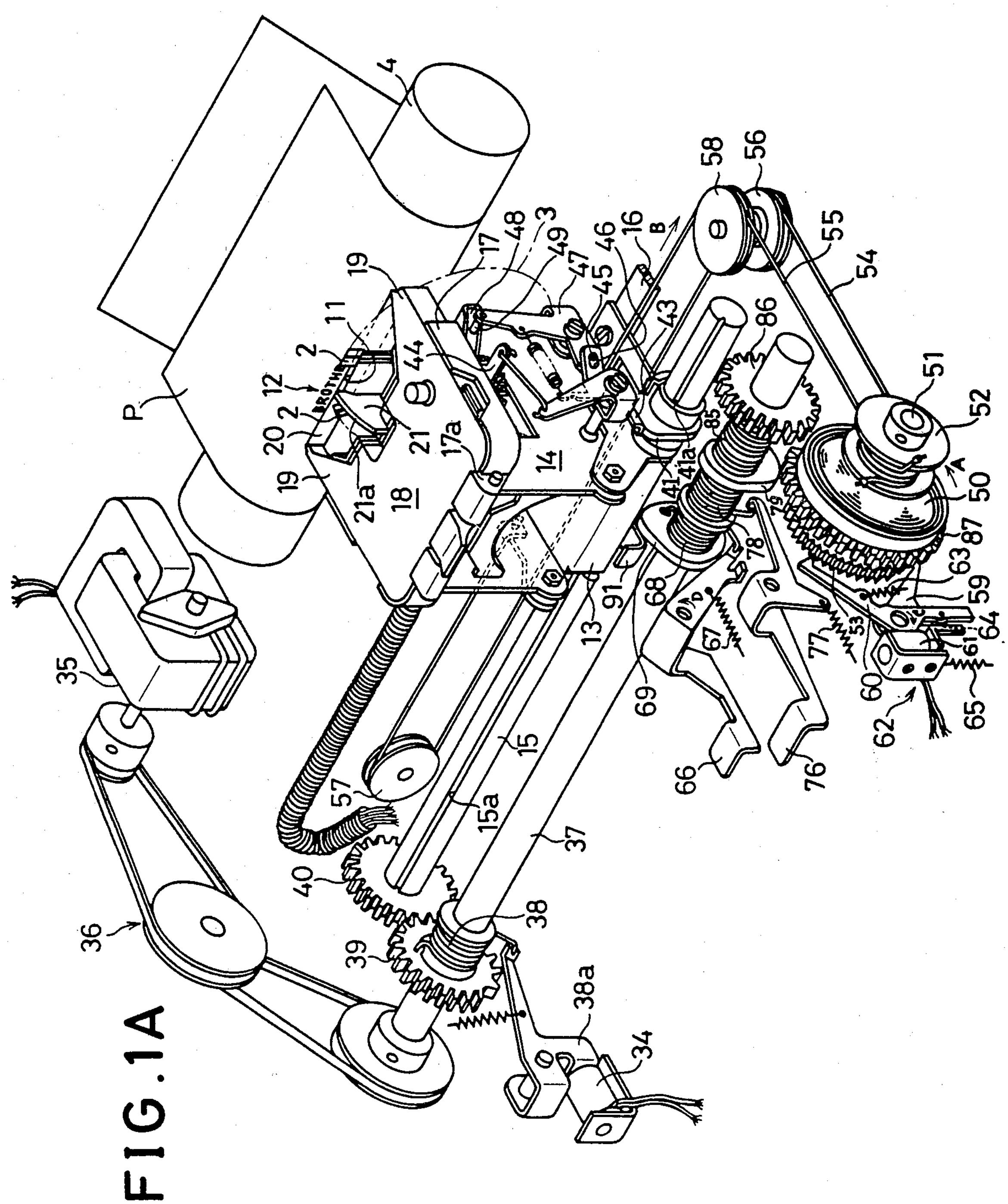
FIG. 1A is a perspective view showing the outline of mechanisms of an electronic typewriter according to the present invention.
Figure 2:
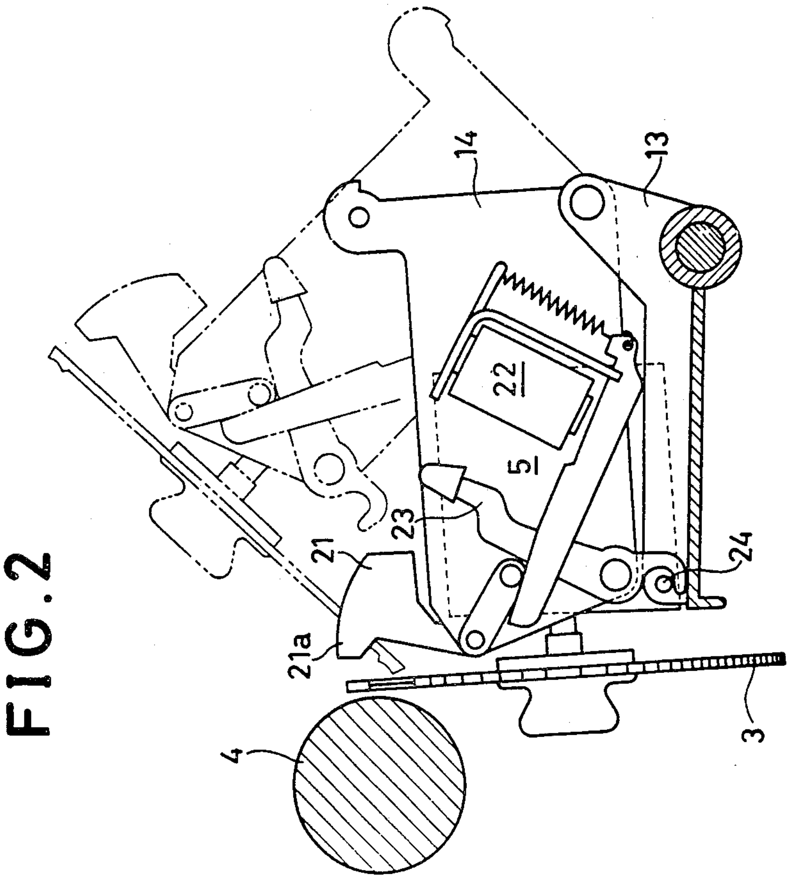
FIG. 2 is a sectional view of the structure for mounting and demounting the print head.

A print hammer 21 is mounted pivotally on the head support 14 in the same way as the print head 1, and its head region is shaped substantially into a sector as shown in FIGS. 1A and 2 so as to obtain a fixed inertia mass. The bent edge portion 21*a* of the head region is curved along the locus of rotation of the print hammer 21. Since this hammer is composed of a thin plate member and formed in the above-described shape, the partial area of the paper P hidden by the print hammer 21 is minimized to offer a remarkable convenience for making the printed letters 12 visible. A first electromagnet 22 is secured to the head support 14 and is energized in response to a hammer trigger signal 214 so as to drive the print hammer 21. Therefore, a selected type element 2 is actuated to strike the paper P through the ink ribbon 20 lifted to its upper position, so that desired printing is effected on the paper P. The head support 14 holding the said print head 1, ink ribbon cartridge 18, print hammer 21 and first electromagnet 22 in this manner is locked to the head base 13 when an operating lever 23 pivoted on the head support 14 is connected to a pin 24 anchored to the head base 13, as in the state shown by a solid line in FIG. 2. Thus, mounting the print wheel 3 on the rotor shaft 7 or demounting the same therefrom can be performed by disengaging the operating lever 23 from the pin 24 and then rotating the head support 14 relatively to the head base 13 up to the state shown by a two-dot chain line in FIG. 2.

Figure 4:
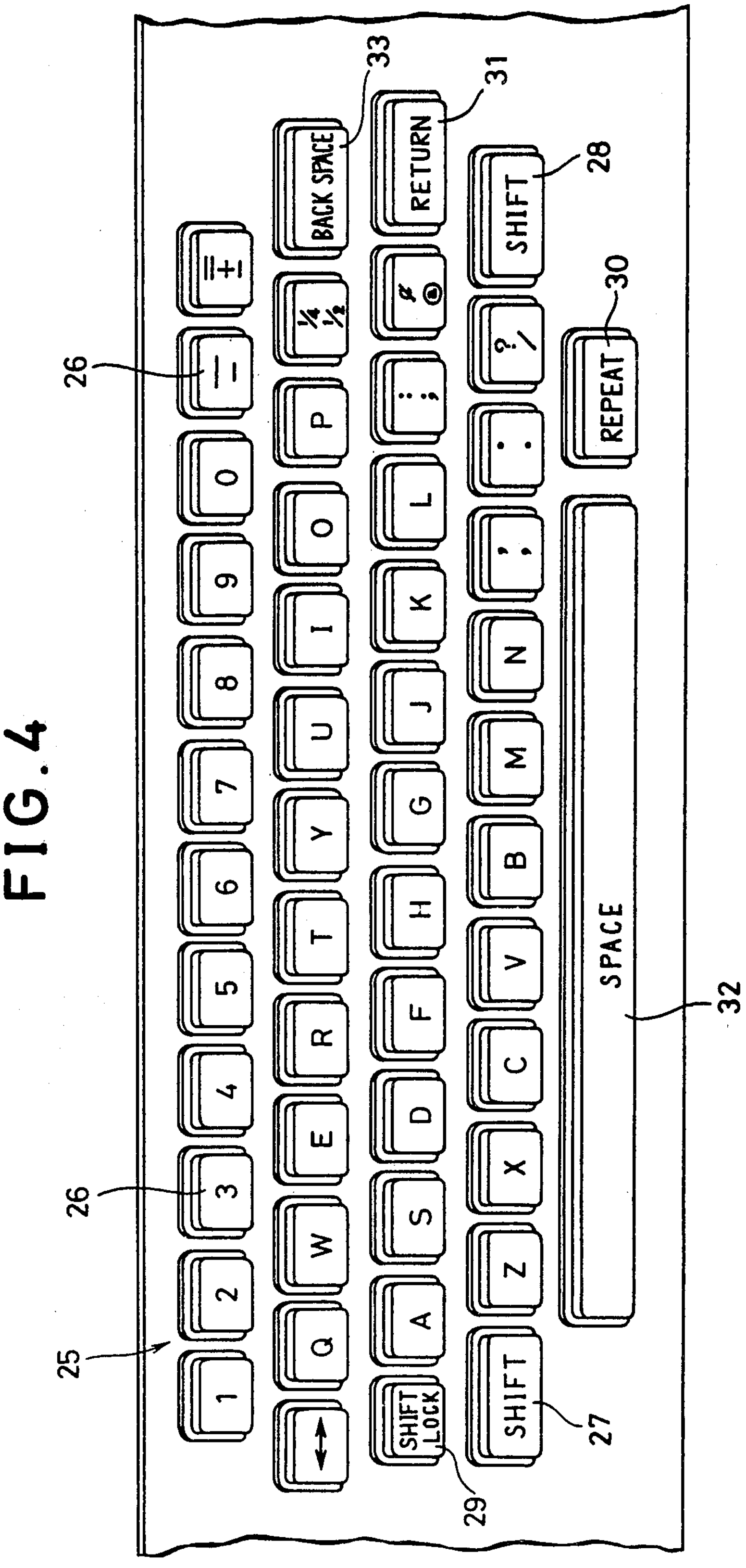
FIG. 4 is a plan view of principal portions of a keyboard.

A keyboard 25 consists of an alpha-numeric key group and a function key group as illustrated in FIG. 4, and each of 44 alpha-numeric keys 26 is capable of feeding input data of two characters (uppercase and lowercase) or a numeral and a symbol according to the action of a shift key which is one of the function keys. The function key group includes two shift keys 27 and 28 located at the left and right of the keyboard 25, a shift lock key 29, a repeat key 30, a return key 31, a space bar 32 and a back space key 33. Some of the keys on the keyboard 25 actuate an electronic part (which will be described afterward) by an electric signal generated upon depression of each key, and some of them actuate individual mechanisms connected thereto directly and mechanically. The alpha-numeric keys 26, shift keys 27 through 29, repeat key 30 and space bar 32 belong to the former, while the return key 31 and back space key 33 belong to the latter.

Prior to giving an explanation on electronic character selection executed by the operation of the alpha-numeric keys 26, that is, the action of bringing a desired type element 2 on the print wheel 3 to the printing position, here the mechanical components will be described with respect to the action of the ribbon lift mechanism performed with printing action for the ink ribbon 20, feeding of the ink ribbon and incrementally moving of the print head 1 as well as back spacing caused by depression of the back space key 33 and also returning caused by depression of the return key 31.

First, the action of the ribbon lift mechanism for the ink ribbon 20 and feeding thereof are performed as follows. When a second electromagnet 34 is energized according to a ribbon trigger signal 213 generated in relation to a printing action, a first control lever **38*a* is rotated to actuate a first clutch 38 mounted on a drive shaft 37 rotated continuously by means of a drive motor 35 via a connecting mechanism 36, so that rotation of the drive shaft 37 is transmitted to a first gear 39. Then, rotation of the first gear 39 is transmitted to the guide bar 15 via a second gear 40 and is thereby transmitted further to a first cam 41 supported rotatably on the head base 13. The first cam 41 has an engaging portion 41 engageable with a groove 15*a* formed on the guide bar 15 in the entire length thereof so as to be driven with rotation of the guide bar 15, and is moved bidirectionally together with the head base 13**.

Figures 1B, 1C, 1D:
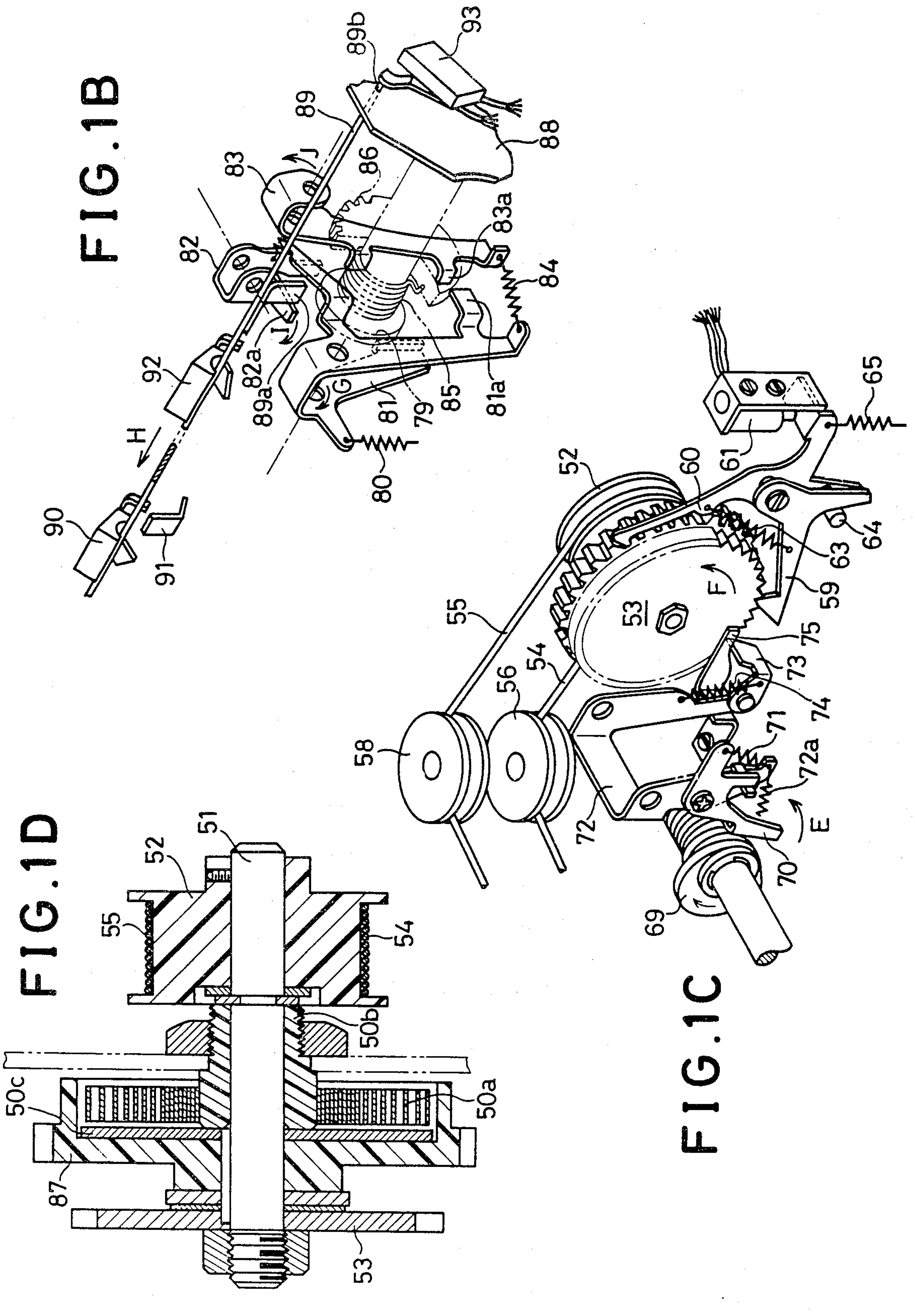
FIG. 1B is a perspective view for explaining the returning and margin stopping of a print head shown in FIG. 1A.
FIG. 1C is a perspective view for explaining the spacing and back-spacing of the print head.
FIG. 1D is a sectional view of the periphery of a spring drum for executing the spacing action.
Figure 1E:
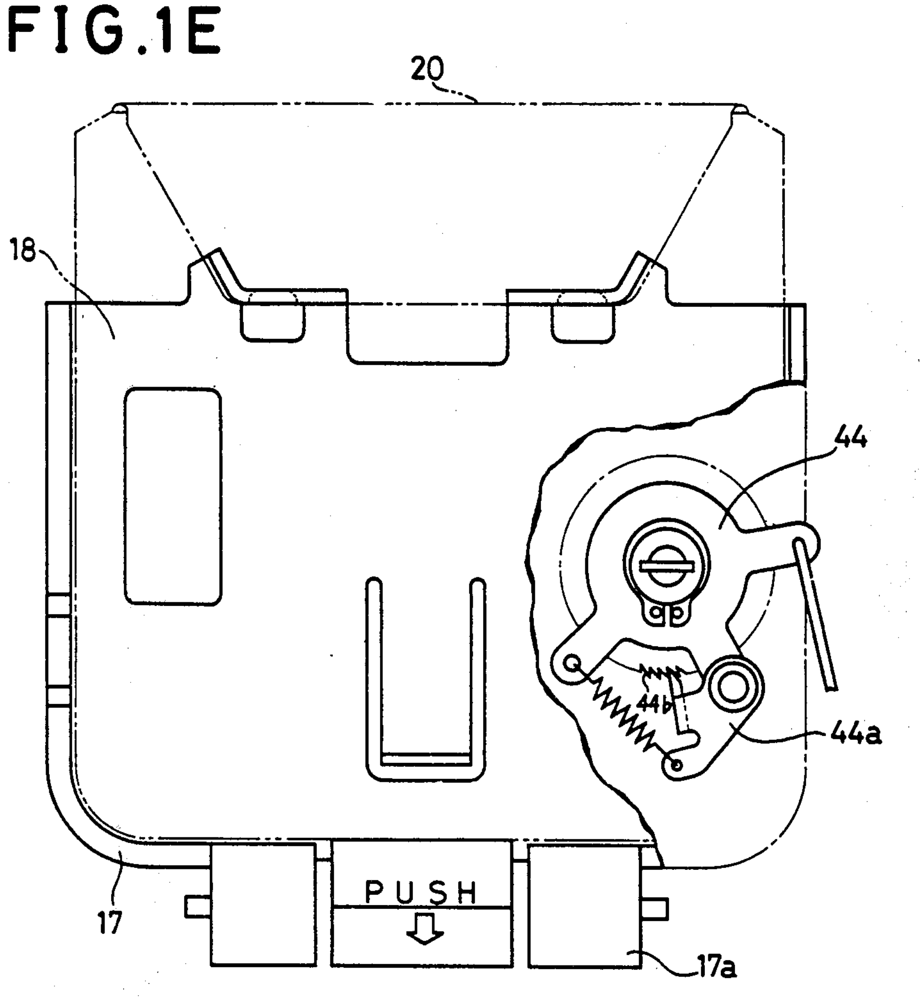
FIG. 1E illustrates the details of an ink-ribbon feed mechanism.

Rotation of the first cam 41 causes counterclockwise rotation (in FIG. 1A) of a follower 43 pressed to the surface of the cam 41 by the elasticity of a spring (not shown), so that a drive roller (not shown) contained in the ink ribbon cartridge 18 is rotated via a lever 44, a feed ratchet **44*a* and a ratchet wheel 44*b* as shown in FIG. 1E, thereby feeding the ink ribbon 20 by a predetermined length. In the meanwhile, the said rotation of the follower 43 is transmitted as clockwise rotation to a crank lever 47 through a pin 45, a slot 46 and connection with the spring 42, and the rotation of the crank lever 47 is further transmitted to the ink ribbon cartridge support 17 via a mechanism which connects a cam portion 48 of the cartridge support 17 and an engaging roller 49 of the crank lever 47. Accordingly, the cartridge support 17 is rotated counterclockwise (in FIG. 1A) around its base portion 17*a*, thereby setting the ink ribbon 20 at the upper printing position. Due to momentary application of the ribbon trigger signal 213, the second electromagnet 34 turns a non-energized state immediately after the first clutch 38 is actuated, and the clutch control lever 38*a* returns to the home position thereof. Consequently, the first clutch 38 is released with merely one rotation of the first cam 41, and both the guide bar 15 and the first cam 41 are brought to a stop, so that the ink ribbon cartridge support 17 and the feed ratchet 44 are also stopped after returning to the respective home positions shown in FIG. 1A. The ribbon trigger signal 213 applied to the second electromagnet 34 for executing such operation is electronically related to a hammer trigger signal 214 for the print hammer 21 as will be described afterward, so that the ink ribbon 20 is brought to the printing position and is returned therefrom with proper timing that causes no impediment to the printing action of the hammer 21**.

Incremental moving of the head base 13 is as follows: A spring drum 50 is similar to the one used in an ordinay typewriter and, as shown in FIGS. 1A and D, is secured integrally with a pulley 52 and a ratchet wheel 53 to a shaft 51, which is supported rotatably by a frame (not shown) through a bearing **50*b*. And the inner end of a spring 50*a* of the spring drum 50 is anchored to the bearing 50*b* secured to the frame, while the outer end thereof is anchored to a plate 50*c* of the spring drum 50. Therefore, a rotatory force is elastically applied in the direction of an arrow A to the spring drum 50, pulley 52 and ratchet wheel 53 through the shaft 51. The spring drum 50 and the head base 13 are connected to each other by means of two wires 54 and 55. One end of the wire 54 is wound clockwise (in FIG. 1A) around the pulley 52 by several turns and is anchored thereto, while the other end thereof is led to guide pulleys 56 and 57 as shown in FIG. 1A and then is anchored to the left end of the head base 13. In the meantime, one end of the wire 55 is wound counterclockwise around the pulley 52 by several turns and is anchored thereto, while the other end thereof is led to the guide pulley 58 and then is anchored to the right end of the head base 13. Accordingly, the elastic force from the spring drum 50 is always applied in the direction of arrow B to the head base 13 through the wire 55**.

Rotation of the spring drum 50 is controlled by a control mechanism 62 consisting of the ratchet wheel 53, a space ratchet 59 engageable therewith, a half space ratchet 60 and a third electromagnet 61. The space ratchet 59 and the half space ratchet 60 are so disposed as to operate together due to the provision of a spring 63 interposed between them and to pin 64 secured to the half space ratchet 60, as shown in FIGS. 1A and 1C. And normally the space ratchet 59 is kept in engagement with the ratchet wheel 53 by a spring 65 to prevent the spring drum 50 from rotating in the direction A, with the half space ratchet 60 being disengaged from the ratchet wheel 53. When the third electromagnet 61 is energized by a trigger signal 215 (which will be described afterward), the half space ratchet 60 is pulled to rotate in the direction C (in FIG. 1A) against the elasticity of the spring 65, and the space ratchet 59 is also rotated in the direction C through the pin 64. Consequently, the space ratchet 59 is disengaged from the ratchet wheel 53, which is then rotated by an angle of a half pitch in the direction A due to the elasticity of the spring drum 50 and is thereby brought into engagement with the half space ratchet 60. And when the third electromagnet 61 is released from the energized state, the half space ratchet 60 is rotated in the direction opposite to the arrow C due to the elasticity of the spring 65 and is thereby disengaged from the ratchet wheel 53, and simultaneously the space ratchet 59 is also rotated in the direction opposite to the arrow C and is brought into engagement with the ratchet wheel 53, which is rotated again by an angle of a half pitch during the above operation.

Such bidirectional rotation of the space ratchet 59 and the half space ratchet 60 caused by the action of the third electromagnet 61 rotates the ratchet wheel 53 by an angle of one pitch in the direction A. As a result, the pulley 52 takes up the wire 55 to advance the head base 13 in the direction B incrementally by a space corresponding to one character. The trigger signal 215 applied to the third eletromagnet 61 is controlled electronically to maintain a predetermined relation to the hammer trigger signal 214 applied to the print hammer 21, and after completion of printing by the hammer 21, the above-described incremental one-character advance is executed immediately.

Now an explanation will be given on the back spacing of the head base 13 or the print head 1 effected by depression of the back space key 33. When the key 33 is depressed, a second control lever 66 as shown in FIG. 1A is rotated in the direction of an arrow D against the elasticity of a first spring 67 and actuates a second clutch 68. Then a back space cam 69 supported rotatably on the drive shaft 37 is rotated therewith to swing a first follower 70 pressed normally to the back space cam 69 as shown in FIG. 1C, and the swing of the first follower 70 thus caused is transmitted to a first rotary member 72. This member is normally rotated in the direction of an arrow E via a spring 71 in response to the rotation of the first follower 70 in the direction E, or is rotated in the opposite direction via a bent portion **72*a* in response to the reverse rotation of the first follower 70. A back space feed ratchet 73 is supported rotatably at the end of the first rotary member 72 and is energized elastically by a second spring 74 so as to be kept in contact with the lower edge of a guide plate 75. And when the first rotary member 72 is rotated in the direction E, the back space feed ratchet 73 is moved along the lower edge of the guide plate 75 and is brought into engagement with the ratchet wheel 53 in its midway, thereby rotating the ratchet wheel 53 in the direction of an arrow F by an angle of one pitch. At this time, the space ratchet 59 comes to engage with a new tooth of the ratchet wheel 53 behind by one pitch, and therefore holds the ratchet wheel 53 posterior to its one-pitch rotation. Such rotation in the direction F is transmitted to the head base 13 or the print head 1 via the pulley 52 and the wires 54 and 55 to move the print head 1 backward opposite to the direction B by a distance corresponding to one character. And upon termination of one rotation of the back space cam 69, the second control lever 66 releases the second clutch 68 to stop rotation of the back space cam 69, thereby returning all of the first follower 70, first rotary member 72 and back space feed ratchet 73** to the respective home positions to complete one cycle of the back spacing action.

Next, returning the head base 13 or the print head 1 is effected by depression of the return key 31 in the following manner. When the return key 31 is depressed, a third control lever 76 as shown in FIG. 1A is rotated against the elasticity of a third spring 77 and actuates a third clutch 78, so that a return cam 79 supported rotatably on the drive shaft 37 is connected thereto to be rotated. The rotation of the return cam 79 serves to rotate, in the direction of an arrow G a second follower 81 which is pressed normally to the return cam 79 by a fourth spring 80 as shown in FIG. 1B thereby locking the second follower 81 by a lock member 82. Then a fifth control lever 83 actuates a coil spring clutch 85 by the cooperation of projections 81*a* and 83*a* formed respectively on the second follower 81 and the control lever 83, and a fifth spring 84 stretched between them. And thus a third gear 86 supported rotatably on the drive shaft 37 is rotated therewith. Subsequently, rotation of the third gear 86 is transmitted to a second gear 87 assembled integrally with the spring drum 50, thereby rotating the pulley 52 in the direction opposite to the arrow A to start the returning action that moves the head base 13 or the print head 1 in the direction opposite to the arrow B. At this time, the space ratchet 59 kept in engagement with the ratchet wheel 53 is displaced from the locus of rotation of the ratchet wheel 53, so that the ratchet wheel 53 is rotated with a second gear 87 to cause executing of the returning action.

When the third control lever 76 is depressed by the return key 31 momentarily and then is returned to the home position immediately, the return cam 79 is driven to make merely one rotation. However, if depression of the return key 31 continues, it causes continuous rotation of the return cam 79 to maintain the second follower 81 in the state locked by the lock member 82 so that the fifth control lever 83 keeps the coil spring clutch 85 actuated to continue the returning action. This action is brought to a stop when a left margin stopper 90 comes to strike a carriage stopper 91 fixed on the head base 13. The left margin stopper 90 is positioned selectively to a margin rack 89 which is supported by left and right frames 88 (right frame alone is shown partially in FIG. 1B) of the typewriter in the manner to be movable by a predetermined distance and is held substantially at a neutral or home position thereof.

That is, when the carriage stopper 91 on the head base 13 strikes the left margin stopper 90, the margin rack 89 is moved in the direction of an arrow H by a predetermined distance. Then, the lock member 82 is rotated in the direction of an arrow I in accordance with such motion of the margin rack 89 via a bent portion **89*a* of the margin rack 89** and a bent portion 82*a* of the lock member 82, thereby releasing the second follower 81 from the locked state shown in FIG. 1B and permitting the same to rotate in the direction opposite to the arrow G by the elasticity of the fourth spring 80. Consequently, the clutch 85 actuated by the fifth control lever 83 is released therefrom to stop the rotation of the third gear 86. And upon stop of the third gear 86, the head base 13 is moved in the direction B by the elasticity of the spring drum 50 so that, when the margin rack 89 returns to its home position, the space ratchet 59 displaced from the locus of rotation of the ratchet wheel 53 is brought into engagement therewith to stop the rotation of the spring drum 50. Thus, the print head 1 or the head base 13 is set at the printing start position to complete the returning action.

Now a brief description will be given on the action performed when the head base 13 is moved in the direction B with incremental advancing on the printing operation, spacing or tabulating and the carriage stopper 91 engaged with the right margin stopper 92. Upon engagement of the carriage stopper 91 with the right margin stopper 92, the margin rack 89 is moved in the direction opposite to the arrow H from its home position so that the right end 89*b* thereof actuates the switch 93 to generate a margin right signal 94. This signal serves to prevent the subsequent printing action, as will be described afterward. Although not shown, the return cam 79 is used also as a drive source for feeding the paper P to effect line spacing, so that one-line spacing is executed at every rotation of the return cam 79 caused by the aforementioned depression of the return key 31.

In such electronic typewriter, all the actions of bringing a desired type element 2 to a printing position, lifting the ink ribbon 20, driving the print hammer 21 and moving the print head 1 posterior thereto are controlled electronically in the manner to maintain a predetermined relation among them. However, the time required for striking the type element 2 by driving the print hammer 21, the time required for lifting the ink ribbon 20 to the printing position, and the time required for advancing the print head 1 by one-character distance in response to individual trigger signals are substantially constant respectively although being different from one another, whereas the time required for rotating the print wheel 3 varies depending on the angle of rotation of the type element 2. And for executing the consecutive printing action at a high speed, it is preferred to effect control in such a manner that a desired type element 2 is struck by the print hammer 21 immediately after being brought to a printing position and also that the ink ribbon 20 is already lifted to the printing position at this moment. Unidirectional rotation alone of the print wheel 3 is disadvantageous since it extends the time for bringing a desired type element 2, and therefore bidirectional rotation becomes necessary. However, the time required for the print wheel 3 to make a half rotation is longer than the time needed for lifting the ink ribbon 20 by the force of the drive motor 35, and the time for driving the print hammer 21 is far shorter than the former. Moreover, with respect to the one-character advance of the print head 1, a trigger signal is applied for that after the lapse of a short period of time from generation of a trigger signal for the print hammer 21, so that a desired action can be performed without any delay posterior to printing by the print hammer 21.

Accordingly, in the case of rotating the print wheel 3 by merely a small angle, a desired printing action is executable within the time required for lifting the ink ribbon 20 through such control that is effected by generating a trigger signal to lift the ink ribbon 20 simultaneously with start of rotation of the print wheel 3, and then generating trigger signals individually for driving the print hammer 21 and moving the print head 1 immediately before arrival of the ink ribbon 20 at the printing position.

However, when the print wheel 3 needs to be rotated by any angle greater than a certain degree for printing, if a series of aforesaid trigger signals are generated simultaneously with start of rotation thereof, then mistyping and mechanical breakdown will occur as the printing is performed prior to stop of the print wheel 3. Thus, it is necessary to generate such trigger signals, particularly the one for lifting the ink ribbon 20, in the midway of rotation of the print wheel 3.

With respect to the action of returning the print wheel 3 to the home position for rendering the printed letters visible, termination of the printing action is delayed if a series of input alpha-numeric data are fed momentarily. In such a case, therefore, bringing the next type element 2 may be performed successively without returning the print wheel 3 to the home position.

The most important in quickly executing the printing action is how to effect quick rotation and stop of the print wheel 3 or the rotor of the step motor 5, for shortening the time required for bringing a desired type element 2 in case a relatively wide angle of rotation is needed. And in relation thereto, it becomes also important to achieve accurate and rapid execution of lifting the ink ribbon 20, driving the print hammer 21 and moving the print head 1.

Figure 5:
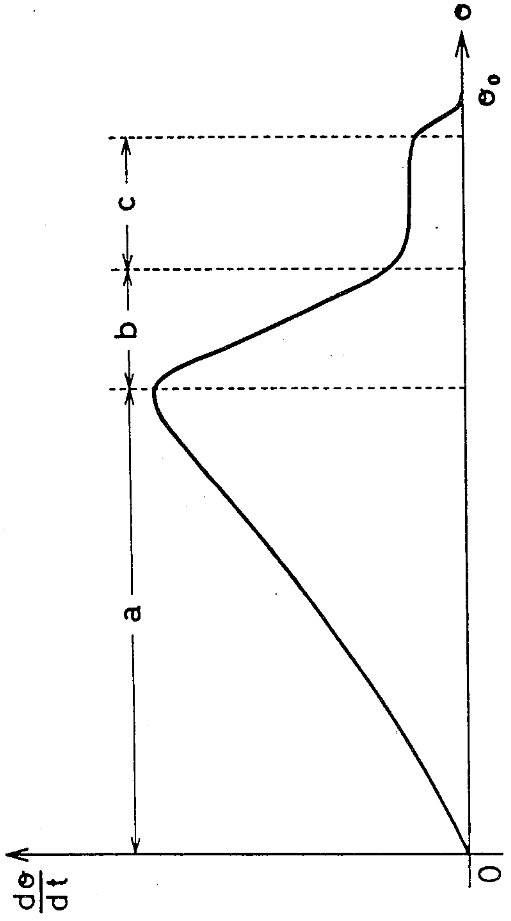
FIG. 5 is a graphic diagram representing the speed characteristic curve of the rotor of the step motor.

In order to rotate the rotor of the step motor by a predetermined angle within a short period of time, it is desirable that this be done as shown in FIG. 5, wherein the rotation from the present position 0 to the destinating position $\theta_o$ is divided into start—acceleration range "a"—deceleration range "b"—constant low speed range "c"—stop. The constant low speed denotes the value which is adequate for stopping the step motor instantly and is determined according to a signal based on the maximum pull-in pulse rate. Theoretically the constant low speed range "c" is not necessary, but practically the existence of some portion of this range provides satisfactory stopping characteristic in most cases. The boundary between the acceleration range "a" and the deceleration range "b" may be set at a point considerably or slightly beyond the middle point in the entire stroke to achieve quicker driving to the destinating position $\theta_o$, and the dimension beyond the middle point is determined in relation to the length of the entire stroke. In FIG. 5, the ordinate denotes the speed ($d\theta/dt$), and the abscissa denotes the distance $\theta$ respectively.

Such rotation can be effected accurately and satisfactorily by first accelerating the rotor of the step motor gradually from start with application of a greater amount of energy while detecting the position thereof, then applying thereto a great deceleration torque upon arrival at the boundary, subsequently releasing the deceleration torque immediately before arrival at the constant low speed and, after maintaining the rotation at such constant low speed, advancing the process to the stopping stage.

Stopping is attained by continuously keeping the state where a last energizing signal is applied. Practically, however, the rotor of the step motor causes damped oscillation about the destinating position when brought to a stop, and this damped oscillation exerts a great influence on the action to be performed in succession. When the angle per step of the rotor of the motor 5 corresponds to the dimension from one type element 2 to the next as in this embodiment, a desired type element comes to oscillate leftward and rightward from the printing position opposed to the print hammer 21, and if impacting is performed immediately by the print hammer 21, it will deteriorate the typing quality in the extreme. And to obtain a satisfactory typing quality, it is necessary to wait until completion of the damped oscillation that requires several tens of milliseconds. This is a considerably great loss of time, which brings about a functional degradation of the electronic typewriter that should meet the requirement of quickly printing.

According to the various experiments conducted by the inventors, it has been proven that the characteristic of the rotor (and its light load) of the step motor at a stop can be represented approximately by a kinetic equation $$J\frac{d^2\theta}{dt^2} + D\frac{d\theta}{dt} + K\theta = 0$$

of a quadratic oscillation system, in which: J is moment of inertia of rotor (and load); $\theta$ is displacement angle of rotor; t is time: D is the attenuation constant of rotor (and load); and K is restoration constant.

In the above kinetic equation, when the natural circular oscillation frequency is $Wn=\sqrt{K/J}$ and the attenuation ratio is $\beta=D/2\sqrt{JK}$, the equation may be rewritten as $$\frac{d^2\theta}{dt^2} + 2\beta_n\frac{d\theta}{dt} + W_n^2\theta = 0 \quad (1)$$

Depending on the range of $\beta$, Equation (1) is solved as:

when $\beta < 1$, $\theta(t) =$ $$\sqrt{\theta_o^2 + \frac{(W_o + \beta W_n\theta_o)^2}{(1-\beta^2)W_n^2}} \cdot e^{-\beta W_n t} \cdot \sin\left(\sqrt{1-\beta^2}\, W_n t + \alpha\right)$$

when $\beta = 1$, $\theta(t) = \{(W_n\theta_o + W_o)t + \theta_o\} \cdot e^{-W_n t}$ and when $\beta > 1$, $\theta(t) =$ $$\frac{(\beta + \sqrt{\beta^2-1})W_n\theta_o + W_o}{2\sqrt{\beta^2-1}\,W_n} \cdot e^{-(\beta - \sqrt{\beta^2-1})W_n t} - \frac{(\beta - \sqrt{\beta^2-1})W_n\theta_o + W_o}{2\sqrt{\beta^2-1}\,W_n} \cdot e^{-(\beta + \sqrt{\beta^2-1})W_n t}$$

In the above equations, when $t=0$: $\theta(t)=\theta o$, $(d\theta/dt)=Wo$, and $$\alpha = \tan^{-1}\frac{\theta_o W_n\sqrt{1-\beta^2}}{W_o + \beta W_n\theta_o}$$

Figure 6:
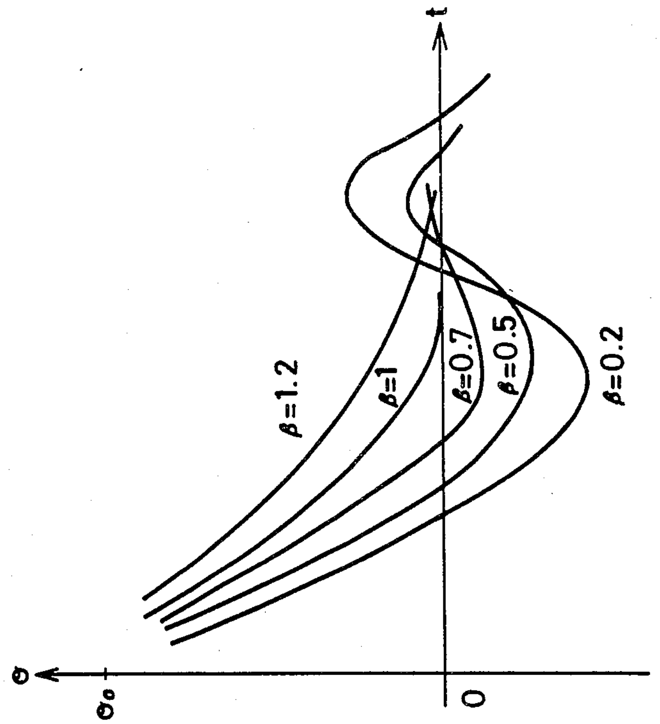
FIG. 6 is a graphic diagram representing the oscillation characteristic curves of the rotor of the step motor in its stopping stage.

FIG. 6 shows the results obtained with respect to various values of $\beta$, and in the actual motion of the rotor (and its load), the value of $\beta$ is approximately 0.2 or less. In FIG. 6, the ordinate denotes the displacement angle of rotor $\theta$, and the abscissa denotes the time t respectively. As will be understood from these analyses, occurrence of unnecessary damped oscillation at a stop of the rotor (and its load) of the step motor is based on the fact that $\beta$ of the rotor (and its load) has a value extremely smaller than 1, and therefore such damped oscillation will be extinct if it becomes approximately 1 or greater than that.

Assuming now that that the torque applied to the rotor (and its load) immediately before stopping is so set as to be expressible by the formula $$\left(-K\theta - D'\frac{d\theta}{dt}\right),$$

then the aforementioned kinetic equation becomes $$J\frac{d^2\theta}{dt^2} + (D + D')\frac{d\theta}{dt} + K\theta = 0.$$

When $Wn=\sqrt{K/J}$ and $\beta'=(D+D')/2\sqrt{JK}$, the above equation may be rewritten as $$\frac{d^2\theta}{dt^2} + 2\beta' W_n\frac{d\theta}{dt} + W_n^2\theta = 0,$$

which is similar to Equation (1) analyzed previously. Therefore, if $\beta'$ is in the proximity of 1, it follows that the rotor (and its load) can be stopped without unnecessary damped oscillation.

Figure 7:
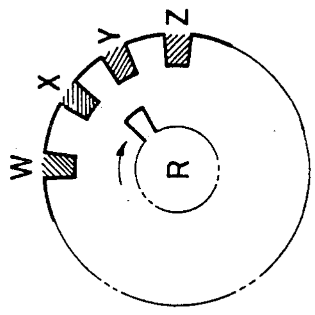
FIG. 7 illustrates the format for explaining stop control for the step motor.

The values of D, J and K are determined depending on the characteristic of the step motor (and its load) or on the conditions in use. Since in this embodiment the speed immediately anterior to the stop is set to be a constant low speed, it is easy to determine the value of D' properly to satisfy $\beta'\simeq 1$ and, on the ground that $(d\theta/dt)$ is the speed of the rotor (and its load), the deceleration torque expressed by the formula $D'(d\theta/dt)$ is attainable with facility immediately anterior to the stop. Thus, the rotor (and its load) can be stopped fast to achieve ideal suppression of the unnecessary damped oscillation. The preceeding of such suppression will be explained with reference to FIG. 7 which illustrates driving by dual phases energization system with a four-pole structure using poles W, X, Y and Z. Suppose now that after advancing from one driving state with the poles W and X energized to the next driving state with the poles X and Y energized, the rotor R is stopped at a stable point determined by the following poles Y and Z. In such a case, for applying the aforementioned torque expressed by the formula $$\left(D'\frac{d\theta}{dt}\right)$$

to the rotor R simultaneously with application of the last energizing signal to the poles Y and Z, an energizing signal of the level corresponding to the torque expressed by the formula $$\left(D'\frac{d\theta}{dt}\right)$$

may be applied to the pole X to which the last energizing signal is not applied. And the said signal level is set up in the stage of assembly in accordance with the step motor and the quantity of its load.

In the rotation control for the step motor in this embodiment of electronic typewriter, the above-described control of acceleration and deceleration is effected merely when the angle of rotation required is greater than 11 steps, and in case the angle is smaller than that, the frequency of pulse signal applied is kept within a range not exceeding the maximum pull-in pulse rate. This problem is closely related to the fact that there is substantially no difference with respect to time if the angle of 10 or less steps is controlled with acceleration and deceleration, and also to driving of the ink ribbon 20. And the timing for application of a trigger signal to drive the ink ribbon 20 in the control of acceleration and deceleration is set up at a point anterior by 20 steps to the destinating position. Accordingly, even with the control of acceleration and deceleration, the said trigger signal may be generated simultaneously with start of rotation of the rotor of the step motor 5. These means have been obtained from various examinations to attain quicker termination of the printing action as mentioned already and are changeable depending on different conditions.

Figure 8:
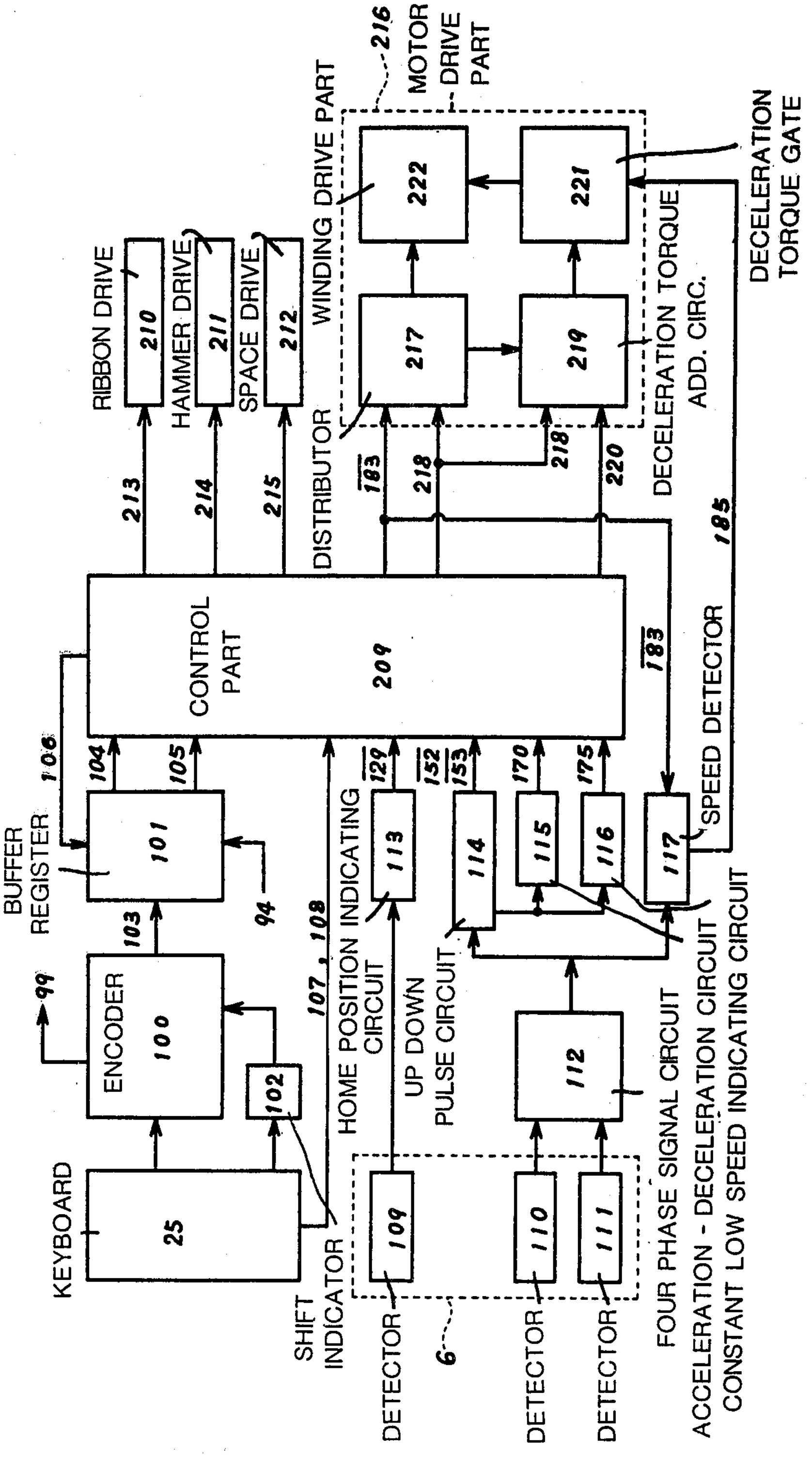
FIG. 8 is a block diagram showing the outline of an electronic unit in the typewriter of the present invention.

Hereinafter a detailed explanation will be given on the electronic control for the typewriter of the structure constituted on the basis of the above-described results. FIG. 8 is a block diagram showing the entirety of an electronic control unit in the electronic typewriter, in which an input part comprises a keyboard 25, an encoder 100, a buffer register 101 and a shift indicator 102. By the operation of an alpha-numeric key 26 on the keyboard 25, alpha-numeric data is fed as an input to the encoder 100, where a depressing signal 99 representing that the alpha-numeric key 26 is in a depressed state thereof is generated and simultaneously the alpha-numeric data from the keyboard 25 is converted into an encoded digital signal according to the output of the shift indicator 102 in response to the operation of the shift keys 27, 28 and 29, and a binary digital signal 103 thus obtained is put into the buffer register 101.

The buffer register 101 stores the binary digital signal 103 therein temporarily and, when being ready for producing an output, generates an output ready signal 104 and further provides an encoded alpha-numeric signal 105 at its output terminal. The alpha-numeric signal 105 is cleared by a damping signal 106 produced by the subsequent printing operation, and the buffer register 101 waits for the next input digital signal 103. The buffer register 101 is so connected that the content thereof is cleared by the aforementioned margin right signal 94 and an initial reset signal 208 generated at turn-on of a power supply.

When a plurality of alpha-numeric keys 26 are depressed in succession momentarily, the contents thereof are encoded sequentially by the encoder 100 and then are stored in the buffer register 101, where an output ready signal 104 is generated at every clear of the preceding alpha-numeric signal 105 by the damping signal 106 so that the alpha-numeric signals 105 are put out sequentially. On the keyboard 25, a repeat signal 107 and a space signal 108 are also produced by the operation of the repeat key 30 and the space key 32.

Figure 9:
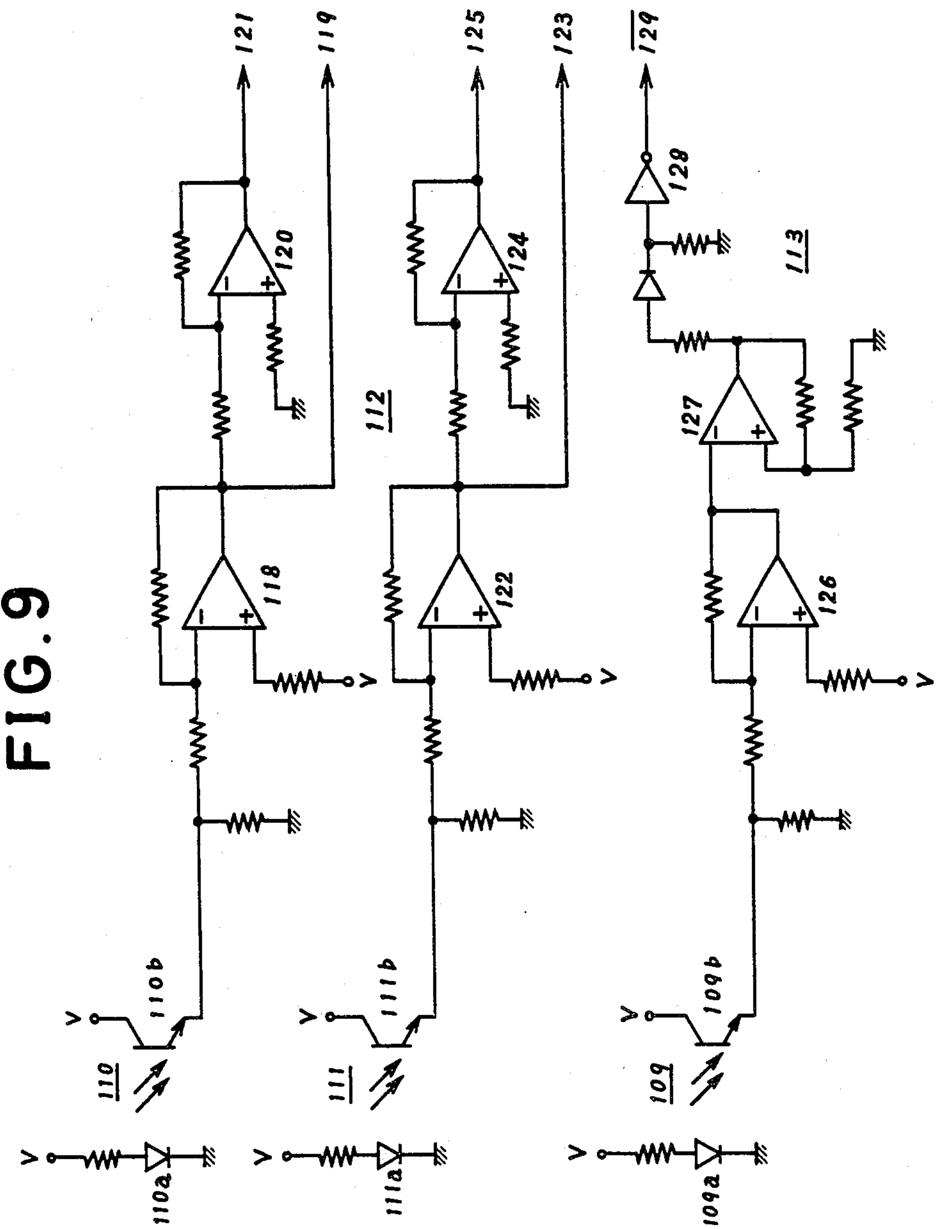
FIG. 9 is a circuit diagram of a detecting part for sensing the state of rotation of the rotor of the step motor.
Figure 10:
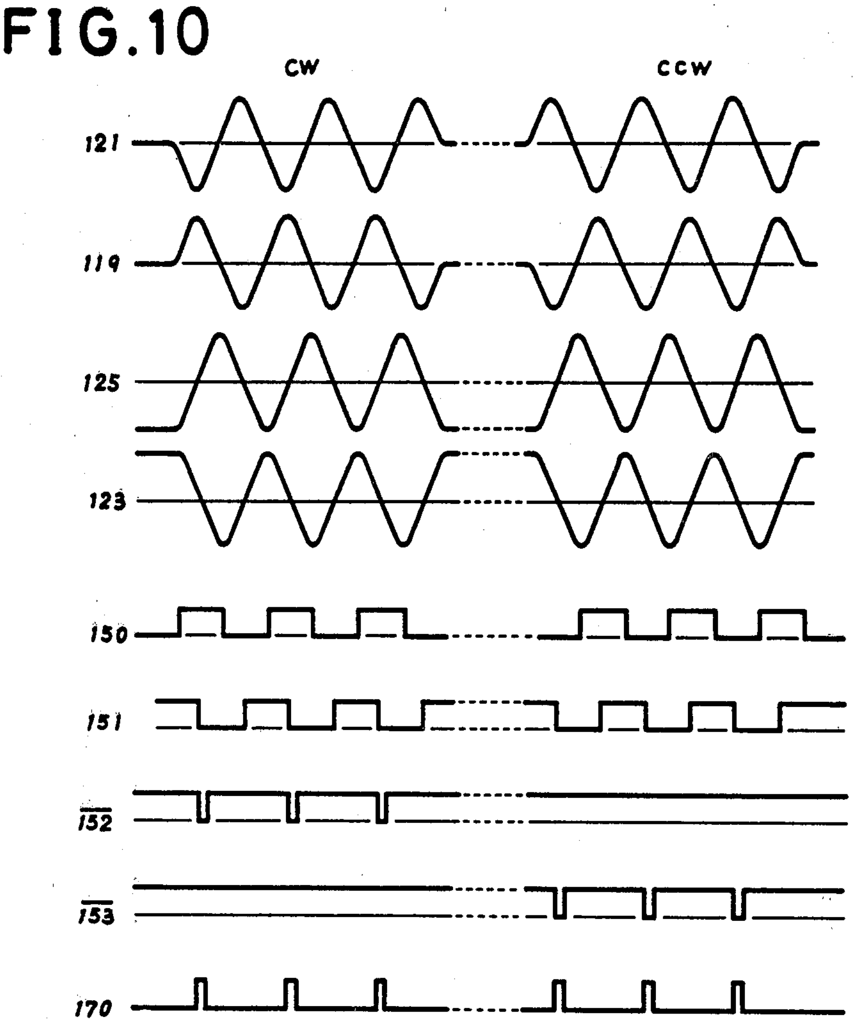
FIG. 10 illustrates the waveforms of signals associated with the detecting part of FIG. 9.

The detecting part for sensing the rotational state of the rotor of the step motor 5 comprises three detectors 109, 110 and 111 constituting a detecting device 6, a four-phase signal circuit 112, a home-position indicating circuit 113, an up-down pulse circuit 114, an acceleration-deceleration signal circuit 115, a constant low-speed indicating circuit 116 for sensing that the rotation speed of the rotor of the step motor 5 is below a predetermined speed, and a speed detector 117 for producing a signal of the level corresponding to the aforementioned torque expressed by the formula $$\left(D'\frac{d\theta}{dt}\right)$$

in accordance with the rotation speed of the rotor of the step motor 5. FIG. 9 illustrates the details of the detectors 109 through 111, the four-phase signal circuit 112 and the home-position indicating circuit 113. As already described in connection with FIG. 3, each of the detectors 109, 110 and 111 consists of a light emitting diode 109*a*, 110*a* or 111*a* and a photosensitive transistor 109*b*, 110*b* or 111*b* opposed to the related diode individually through a shutter disk 6*a*. Two sine-wave signals are produced out of the signal obtained from the detector 110: one is an output 119 of an amplifier 118 in the four-phase signal circuit 112, and the other is an output 121 formed through inversion of the output 119 by an amplifier 120. Similarly, out of the signal obtained from the detector 111, two sine-wave signals 123 and 125 are produced by amplifiers 122 and 124 respectively. When the rotor of the step motor 5 is in clockwise rotation, the phases of these output signals are sequentially delayed by 90 degrees in the order of 119-125-121-123; and when the rotor of the step motor is in counterclockwise rotation, the order is reversed. Such state is shown in FIG. 10, where CW stands for clockwise rotation and CCW for counterclockwise rotation.

The signal from the detector 109 is amplified by an amplifier 126 and then is shaped into a rectangular-wave signal by an amplifier 127 of the home-position indicating circuit 113, and further a home position signal 129 is formed therefrom by an inverter 128. In the diagram, 129 signifies that the home position signal 129 is normally at a high level and is changed to a low level only when indicating the home position. Hereinafter the same marking will be applied to all signals.

Figure 11:
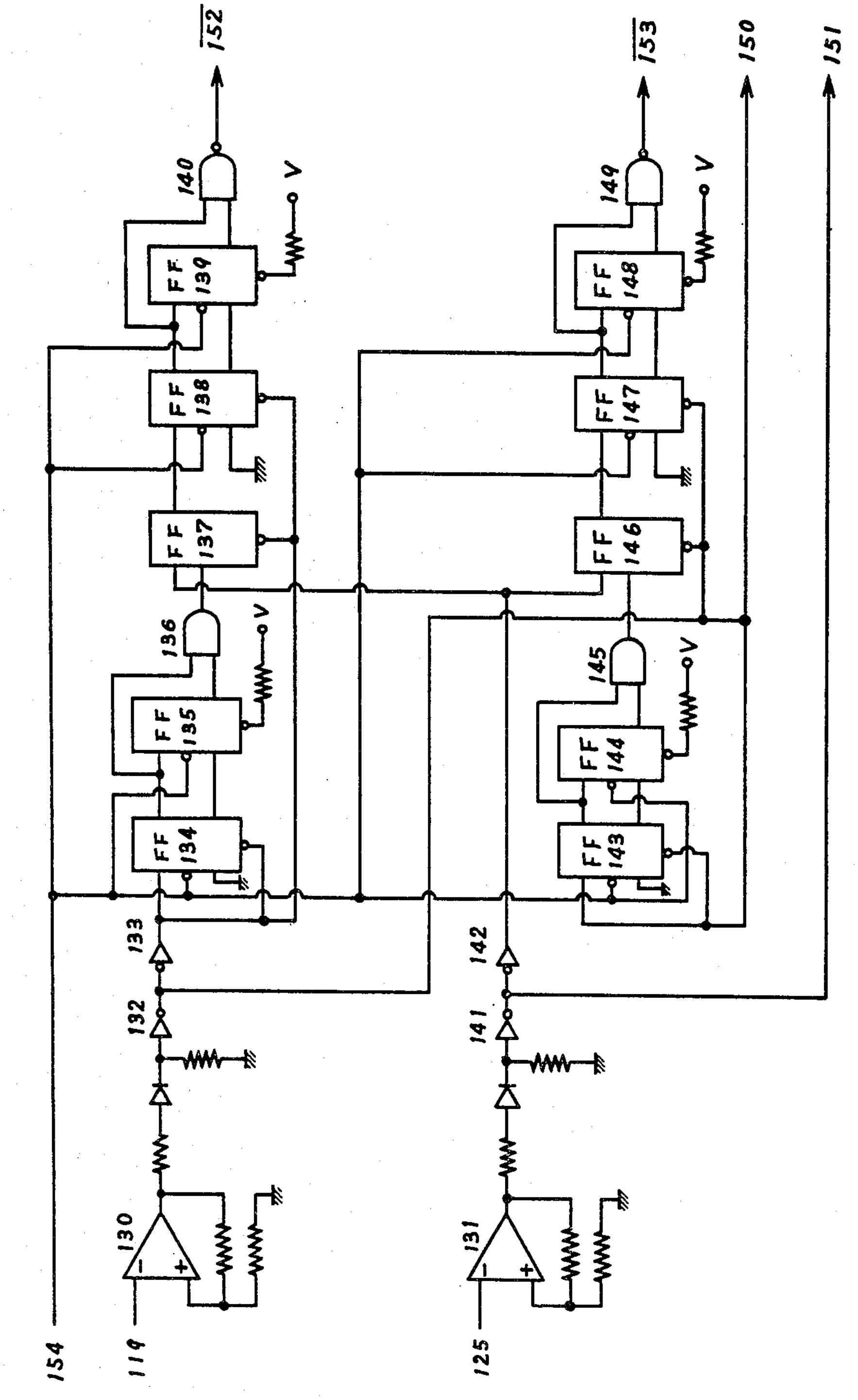
FIG. 11 is a circuit diagram showing the details of an up-down pulse forming part.

FIG. 11 illustrates the details of the up-down pulse circuit 114, wherein sine-wave signals 119 and 125 from the four-phase signal circuit 112 are fed thereto and are shaped into rectangular-wave signals by amplifiers 130 and 131 respectively. The output of the amplifier 130 is inverted by an inverter 132 to form a signal 150, which serves as a set in put to a flip-flop circuit (hereinafter referred to as FF) 134, a clear input to the same and also as a clear input to FF 146 and 147. Via an inverter 133, the signal 150 further serves as a set input to FF 134, a clear input to the same and also as a clear input to FF 137 and 138. The outputs of FF 134 are fed directly to FF 135, and both the set output of FF 134 and the reset output of FF 135 are fed to an AND gate 136, whose output becomes a lock trigger signal to FF 137. The set output of FF 137 serves as a set input to FF 138, whose outputs are fed directly to FF 139. And both the set output of FF 138 and the reset output of FF 139 are fed to an AND gate 140, whose output then serves as a count-up pulse signal 152.

The output of the amplifier 131 is inverted by an inverter 141 to form a signal 151, and the signal 151 is further inverted by an inverter 142 to serve as a set input to FF 137 and 146. The outputs of FF 143 are fed directly to FF 144, and both the set output of FF 143 and the reset output of FF 144 are fed to an AND gate 145, whose output serves as a trigger signal to FF 146. The set output of FF 146 serves as a set input to FF 147, whose outputs are fed directly to FF 148. And both the set output of FF 147 and the reset output of FF 148 are fed to an AND gate 149, whose output then serves as a countdown pulse signal 153.

Each of FF 134, 135, 138, 139, 143, 144, 147 and 148 is triggered by a clock pulse 154 of 250 kHz, with FF 134, 138, 143 and 147 being grounded through the respective reset input terminals. And the clear input terminals of FF 135, 139, 144 and 148 are connected to a power supply. The inputs in the up-down pulse circuit 114 of such configuration are shown in FIG. 10, of which signals 150 and 151 are fed to the acceleration-deceleration signal circuit 115.

Figure 12:
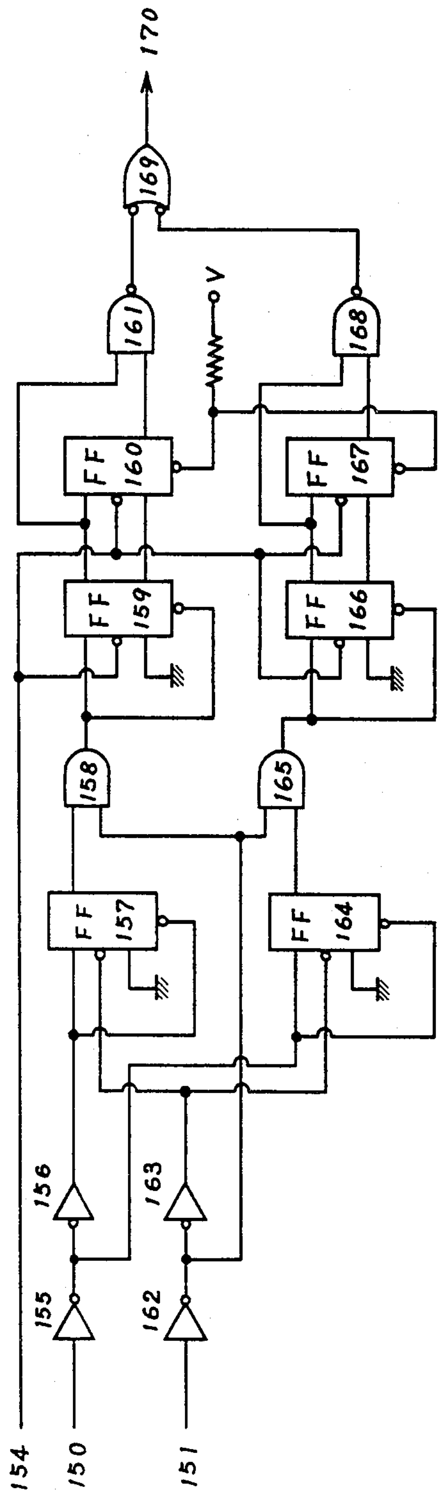
FIG. 12 is a circuit diagram showing the details of an acceleration-deceleration pulse forming part.

FIG. 12 illustrates the details of the acceleration-deceleration signal circuit 115, wherein the signal 150 is inverted by an inverter 155 to form a set input to FF 164 and a clear input to the same, and then is inverted again by an inverter 156 to form a set input to FF 157 and a clear input to the same. The signal 151 is inverted by an iverter 162 and is fed to AND gates 158 and 165, and then is further inverted by an inverter 163 to serve as a trigger signal to FF 157 and 164. The set outputs of FF 157 and 164 are fed respectively to AND gates 158 and 165, whose outputs become set inputs and clear inputs to FF 159 and 166 respectively. The outputs of FF 159 and 166 are fed directly to FF 160 and 167 respectively, and both the set output of FF 159 and the reset output of 160 are fed to an AND gate 161, while the set output of FF 166 and the reset output of FF 167 are fed to an AND gate 168. And the outputs of AND gates 161 and 168 are fed to an OR gate 169, whose output serves as an acceleration-decelearation (AD) pulse signal 170. Each of FF 159, 160, 166 and 167 is triggered by a clock signal 154, and the reset input terminals of FF 157 and 164 are grounded while the clear input terminals of FF 160 and 167 are connected to a power supply.

The AD pulse signal 170 is generated with a delay of 90 degrees (¼ period) from start of rotation of the rotor, as shown in FIG. 10. It will be understood therefrom that generation of the AD pulse signal 170 is effected with a timing earlier by ¾ period than the termination of one-step rotation of the rotor of the step motor 5. Due to the reason to be described afterward, this has a great significance on acceleration control of the step motor 5 and subsequent deceleration control and constant low-speed control, or on constant speed control executed by pulse signal corresponding to the maximum pull-in pulse rate without acceleration-deceleration control.

Figure 13:
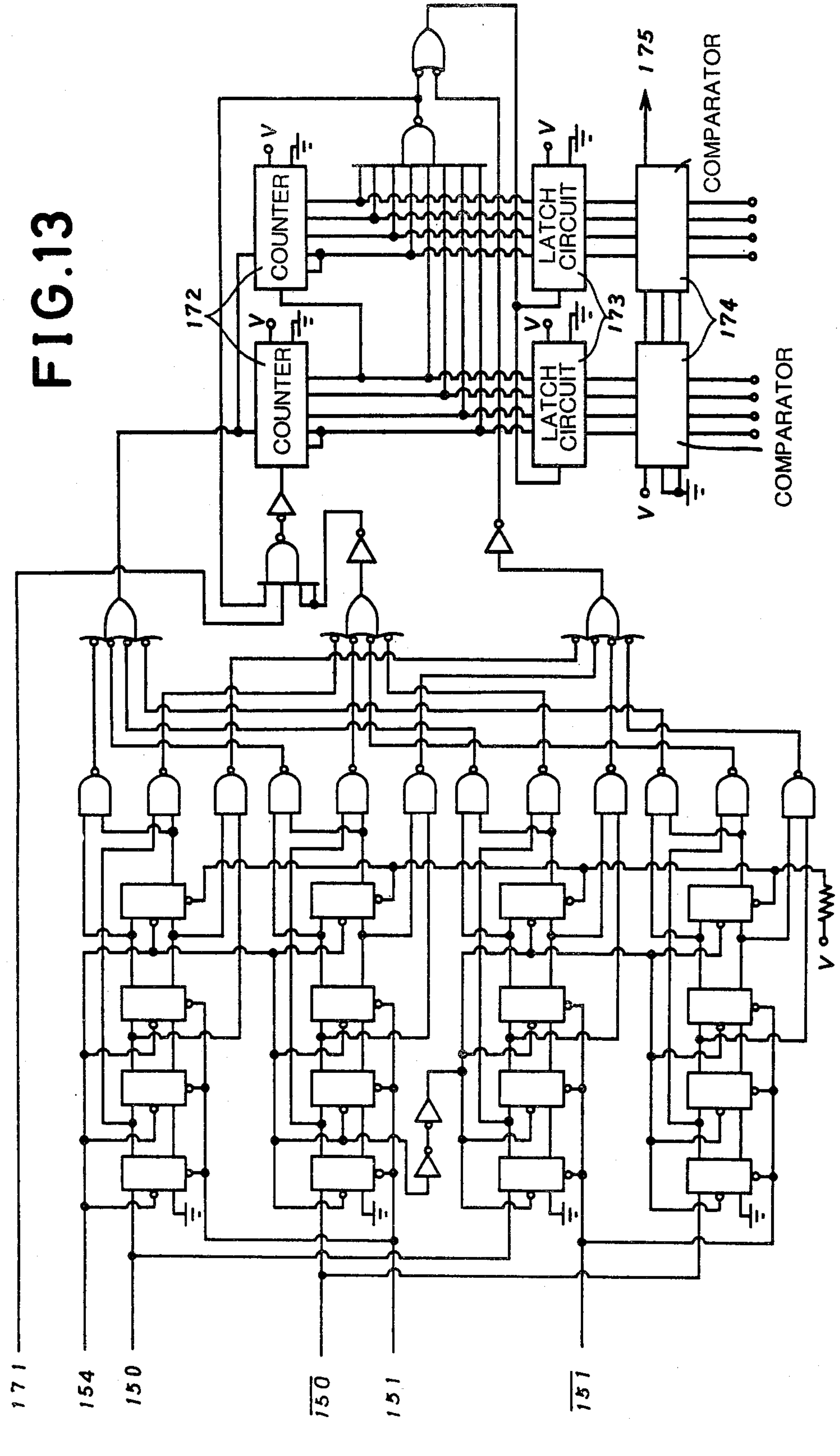
FIG. 13 is a circuit diagram showing the details of a constant low-speed indicating part.

FIG. 13 illustrates the details of the constant low-speed indicating circuit 116, wherein the signals 150 and 151 produced in the up-down pulse circuit 114 and the inverted signals thereof are processed synchronously with clock pulses 154 of 250 kHz, whose number included in every ¼-step rotation of the rotor of the step motor 5 is then counted by means of a counter 172 synchronously with clock pulses 171 of 62.5 kHz. Subsequently, the counted value is latched by a latch circuit 173 and, if it exceeds a predetermined value set up in a comparator 174, a speed indicating signal 175 produced as an output of the comparator 174 is turned to a high level. Practically, a numerical value 78 is set up in the comparator 174 and, when the content of the latch circuit 173 reaches 78, that is, when the rotation speed of the rotor of the step motor 5 is reduced to be lower than approximately 500 r.p.m., the speed indicating signal 175 is turned to a high level. The rotation speed at this moment is slightly higher than the constant low speed mentioned in connection with FIG. 5.

Figure 14:
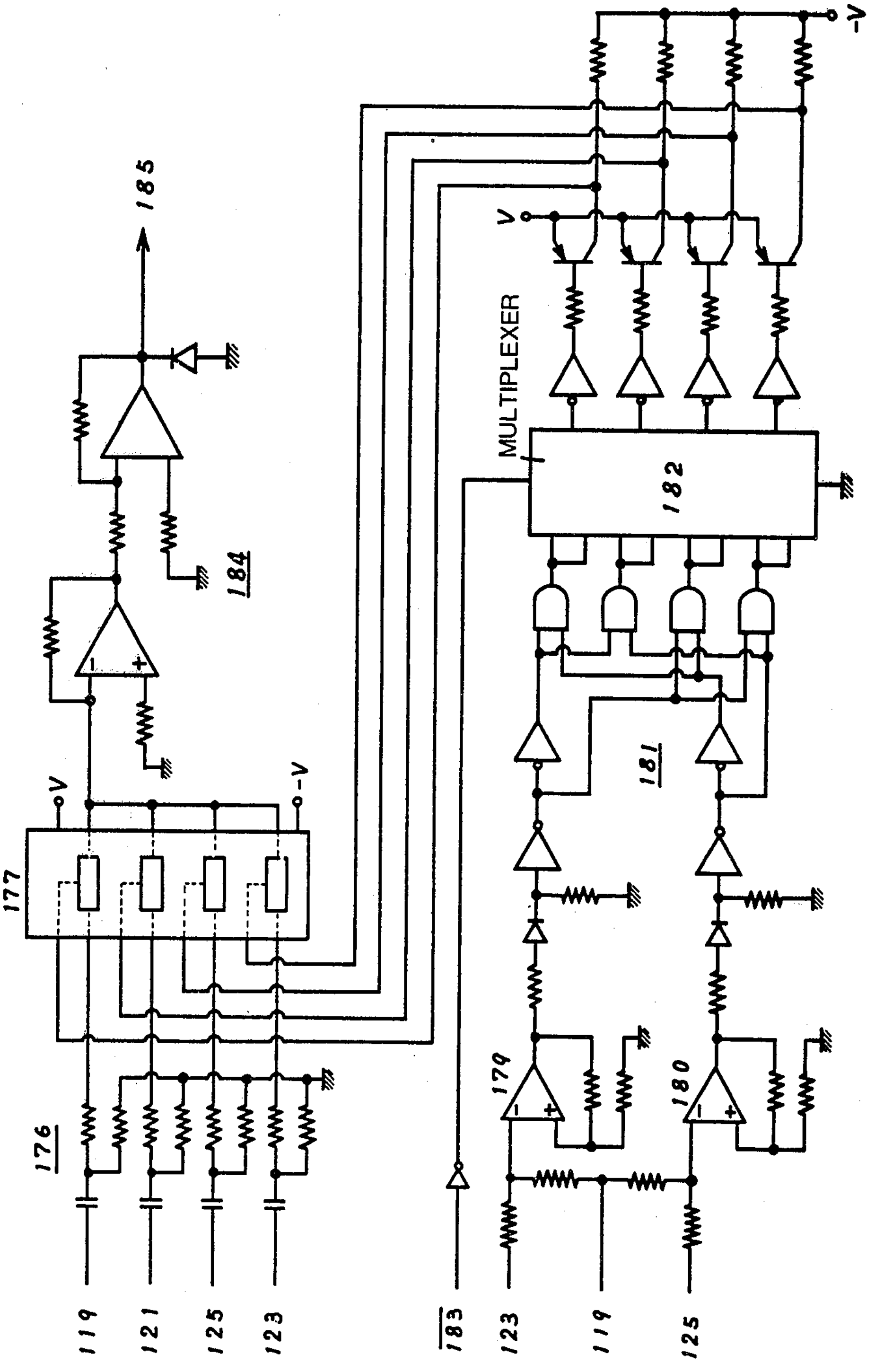
FIG. 14 is a circuit diagram showing the details of a speed measuring part.

FIG. 14 illustrates the details of the speed detector 117, wherein the sine-wave output signals 119, 121, 123 and 125 from the four-phase signal circuit 112 are fed thereto and converted into AC signals, whose amplitude varies in proportion to the speed of rotation or the period thereof, individually by a differential circuit 176 consisting of a capacitor and a resistor. And the AC signals thus obtained are fed to switching gates 177. In the meanwhile, in a gate-signal forming part for controlling each of the switching gates 177, the signals 123 and 125 with superposition of the signal 119 thereon are shaped into rectangular-wave signals by amplifiers 179 and 180 respectively and are further processed by a logic circuit 181 to produce a signal which serves to detect a range indicating the peak of each differential wave signal obtained out of the said sine-wave signals 119, 121, 123 and 125. The output of the logic circuit 181 is fed to a multiplexer 182 which, in accordance with the sequence preset by a direction signal 183, controls each of the switching gates 177 by the signal having detected the said range. As a result, the sum of the entire outputs of the switching gates 177 is a combination of the extracted ranges indicating the peaks of the four differential-wave signals. The said sum is amplified by a group of amplifiers 184 to produce an output signal 185 which corresponds in an analogue mode to the rotation speed of the rotor of the step motor 5 at each moment.

Figure 15:
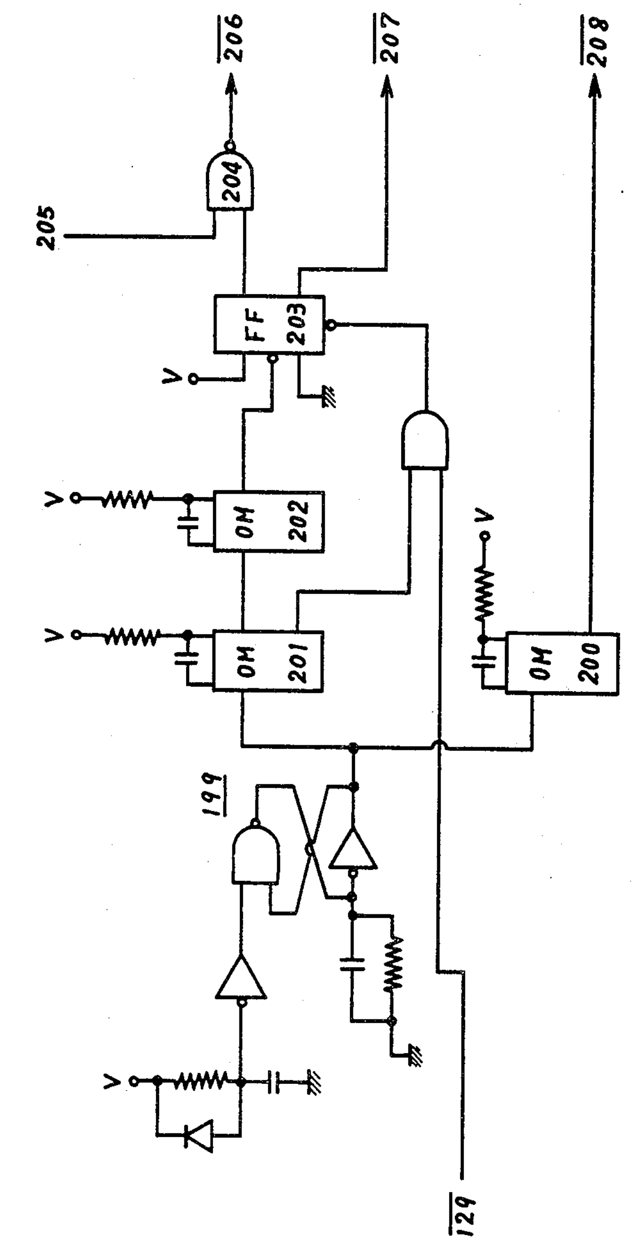
FIG. 15 is a circuit diagram showing the details of an initializing circuit.

FIG. 15 illustrates the details of an initializing circuit employed in this embodiment, although not shown in the block diagram of FIG. 8. When the power supply is switched on, a one-shot multivibrator (hereinafter referred to as OM) 200 is triggered after the lapse of a predetermined time therefrom by a delay circuit 199 and generates an initial reset signal 208, which places each electronic part of the typewriter in an initialized state. Simultaneously, the delay circuit 199 further functions to trigger OM 201, which then triggers OM 202. And subsequently OM 202 triggers FF 203, whose set output controls an AND gate 204 and the reset output thereof serves as an initializing signal 207. The AND gate 204 also receives a clock pulse 205 of 200 Hz which is the pull-in frequency for the step motor 5, and generates an initial drive pulse 206 for driving the step motor 5 in response to setting of FF 203. Generation of the initializing signal 207 and the initial drive pulse 206 is terminated upon arrival of a home-position indicating signal 129. That is, these two signals 206 and 207 enable the clock pulse 205 to drive the step motor 5 after the entire electronic parts are placed in the initial state posterior to turn-on of the power supply, thereby effecting detection of the home position of the rotor of the motor 5.

Referring to FIG. 8 again, the control part 209 receives from such input part and detect part an output ready signal 104, an alpha-numeric signal 105, a repeat signal 107, a space signal 108, a home-position indicating signal 129, up-down pulses signal 152 and 153, an acceleration-deceleration pulse signal 170 and a speed indicating signal 175; and feeds a damping signal 106 to the buffer register 101 in the input unit, and also feeds trigger signals 213, 214 and 215 individually to the ribbon drive part 210 for energizing the second electromagnet 34, to the hammer drive part 211 for energizing the first electromagnet 22, and to the space drive part 212 for energizing the third electromagnet 61 shown in FIG. 1A respectively. Moreover, the control part 209 further feeds a direction signal 183 to the speed detector 117; a direction signal 183 and a drive pulse signal 218 to a distributor 217 constituting a drive part 216 for the step motor 5; and a drive pulse 218 and a deceleration indicating signal 220 to a deceleration-torque adding circuit 219. The signal 220 indicates the timing to apply a deceleration torque to the step motor 5 in the above mentioned deceleration range and immediately before the stop. Prior to explaining the detailed action of such control part 209, the motor drive part 216 will be described below.

Simultaneously with reception of the direction signal 183, drive pulse signal 218 and deceleration indicating signal 220 from the control part 209, the motor drive part 216 also receives from the speed detector 117 a voltage level signal 185 corresponding to the rotation speed of the rotor of the step motor at each moment. The motor drive part 216 consists of a distributor 217, a deceleration-torque adding circuit 219, a deceleration torque gate 221 and a winding drive part 222 for the step motor 5, of which details are shown in FIGS. 16A, 16B, 16C and 16D.

Figure 16A:
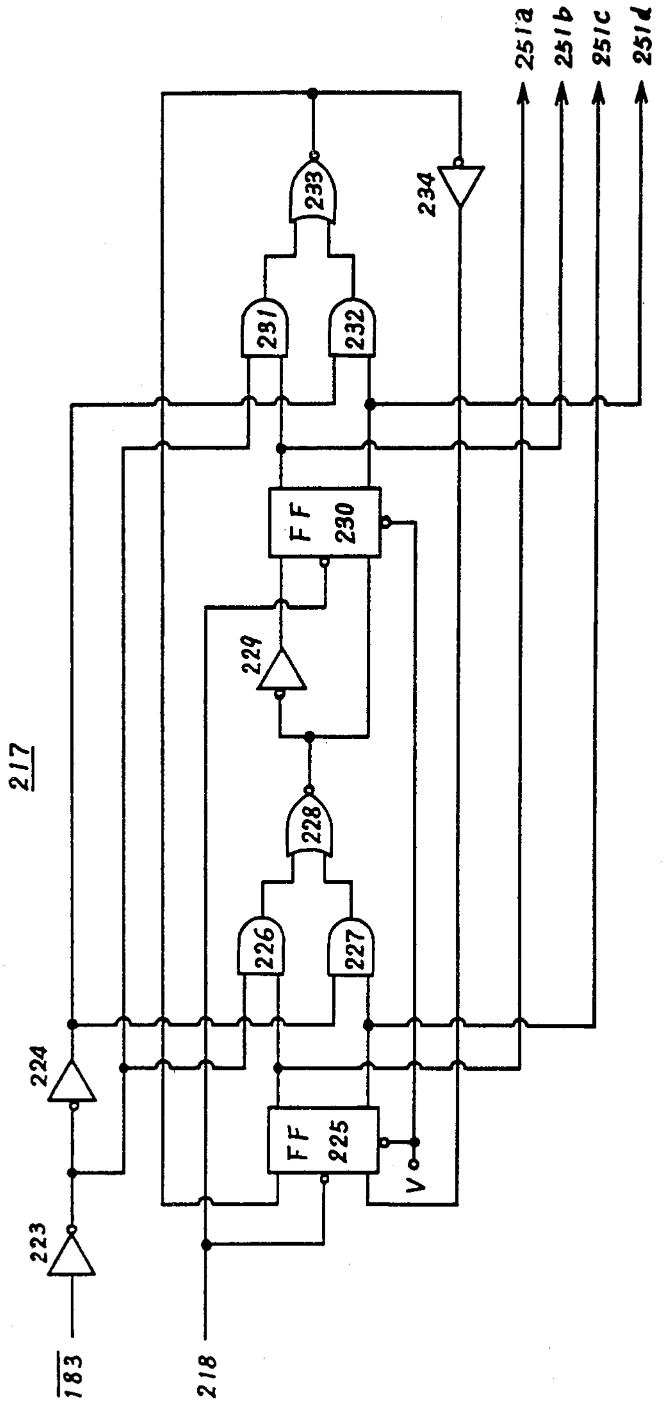
FIGS. 16A, B, C and D are circuit diagrams showing in division the details of a step-motor drive part.

FIG. 16A illustrates the distributor 217, wherein the direction signal 183 is fed to AND gates 226 and 231 via an inverter 223 and then is fed to AND gates 227 and 232 further via an inverter 224, with the drive pulse signal 218 serving as a trigger input signal to FF 225 and 230. The set output 251*a* of FF 225 is fed to an AND gate 226, while the reset output 251*c* thereof is fed to an AND gate 227. The outputs of both the AND gates 226 and 227 are fed to an OR gate 228, whose output serves as a reset input to FF 230 directly and also as a set input thereto via an inverter 229. The set output 251*b* of FF 230 is fed to an AND gate 231, while the reset output 251*d* thereof is fed to an AND gate 232. The outputs of both the AND gates 231 and 232 are fed to an OR gate 233, whose output serves as a set in put to FF 225 directly and also as a reset input thereto via an inverter 234. The outputs 251*a*–251*d* of FF 225 and 230 in this circuit determine the windings to be energized in the four-phase step motor employed in the electronic typewriter of this embodiment.

Figure 16B:
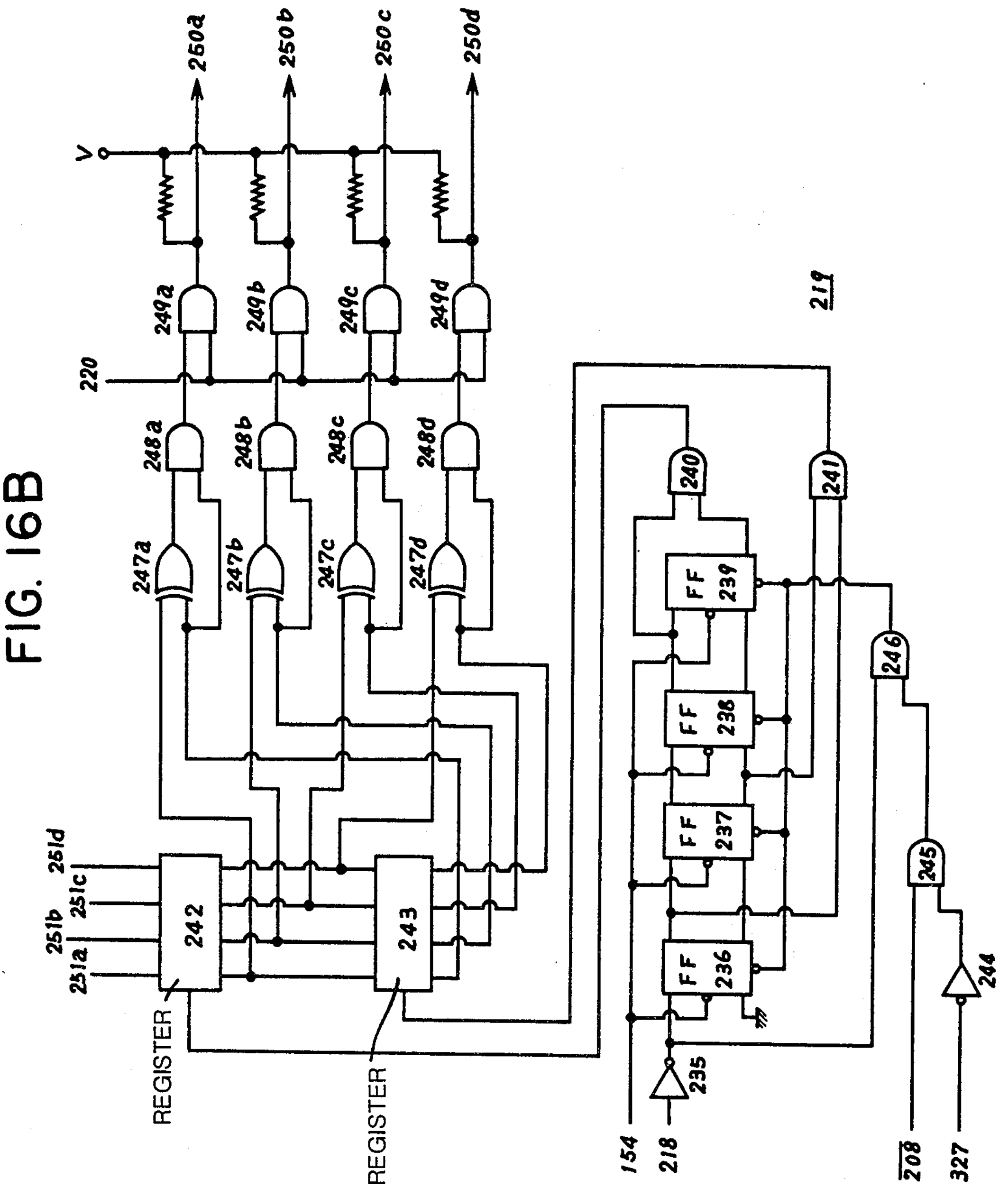

FIG. 16B illustrates the details of the deceleration-torque adding circuit 219, wherein the drive pulse signal 218 becomes via an inverter 235 a set input of FF 236 and an input of an AND gate 246, which also receives the output of an AND gate 245 whose two inputs are a selection signal 327 received via an inverter 244 and an initial reset signal 208. The output of the AND gate 246 serves as a clear input of FF 236, 237, 238 and 239. The input and output terminals of FF 236 through 239 are sequentially connected in series with one another and are triggered by the clock pulse 154, and the reset input terminal of FF 236 is grounded. The set output of FF 236 and the reset output of FF 237 are fed to an AND gate 241, while the set output of FF 238 and the reset output of FF 239 are fed to an AND gate 240 respectively, and the outputs of the AND gates 240 and 241 serve as clock pulse signals to first and second registers 242 and 243.

The outputs 251*a*–251*d* of FF 225 and 230 in the distributor 217, each serving as a signal to indicate the motor winding to be energized at each moment, are fed to the first register 242 synchronously with the output of the AND gate 240, and are further fed to the second register 243 synchronously with the output of the AND gate 241. Consequently, the first and second registers 242 and 243 store therein the signals which indicate the winding being energized and the winding energized for the preceding step. The output of the first register 242 is fed to INHIBIT OR gates 247*a*–247*d*, while the output of the second register 243 is fed to the INHIBIT OR gates 247*a*–247*d* and AND gates 248*a*–248*d*, to which the outputs of the INHIBIT OR gates 247*a*–247*d* are also fed. Then the outputs thereof are fed to AND gates 249*a*–249*d* controlled by the deceleration indicating signal 220, so that deceleration-torque adding signals 250*a*–250*d* to indicate the windings other than the one determined at the moment by the output of the distributor 217 are formed by the AND gates 249*a*–249*d* so as to apply the deceleration torque to the step motor 5.

Figure 16C:
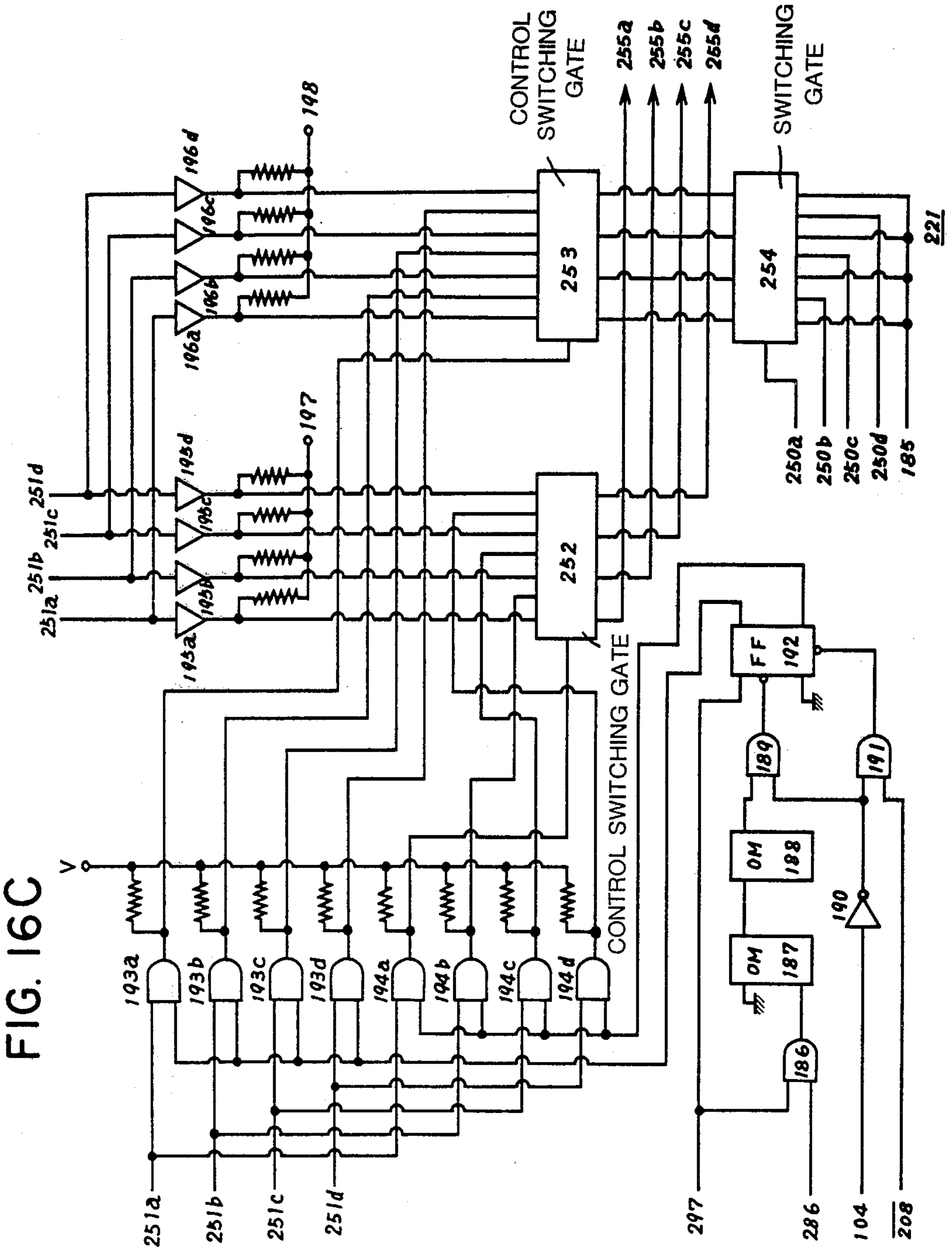

FIG. 16C illustrates principal components of the winding drive part 222 and the details of the deceleration torque gate 221, wherein a return gate signal 297 produced in a start-stop circuit 300 (to be described afterward) is fed to the set terminal of FF 192 and an AND gate 186, which also receives a count-zero signal 286 of a down counter 276 (to be described afterward). The output of the AND gate 186 triggers OM 187, which then triggers OM 188. An AND gate 189 receives both the output of OM 188 and the output ready signal 104 inverted via an inverter 190, and generates a trigger signal to FF 192. The output ready signal 104 inverted via the inverter 190 is also fed, together with an initial reset signal 208, to an AND gate 191 whose output serves as a clear signal to FF 192.

The set output of FF 192 is fed to AND gates 193*a*–193*d*, while the reset output thereof is fed to AND gates 194*a*–194*d*. The AND gates 193*a*–193*d* and 194*a*–194*d* also receive the outputs 251*a*–251*d* of the said distributor 217 respectively and generate outputs which control switching gates 252 and 253. The switching gate 252 determines the winding energized in response to the condition of FF 192 inorder to rotate the rotor of the step motor 5, and receives the outputs 251*a*–251*d* of the distributor 217 via amplifiers 195*a*–195*d* respectively. Since each of the received signals is regulated to a high level by a power supply 197, the current for energizing the step motor 5 comes to be of a large value. In the meanwhile, the switching gate 253 determines the winding energized for holding the step motor 5 during the stop thereof, and receives the outputs 251*a*–251*d* of the distributor 217 via amplifiers 196*a*–196*d* respectively. Since each of the received signals is regulated to a low level by a power supply 198, the current for energizing the step motor 5 during its stop comes to be of a small value.

The output terminals of the switching gates 252 and 253 are connected to energizing-signal output terminals 255*a*–255*d*, but are isolated from each other with respect to the mutual signals. There exists such correlation with regard to another switching gate 254 as well, which is an analogue switch constituting the deceleration torque gate 221 and feeds its output to the energizing-signal output terminals 255*a*–255*d*. The deceleration-torque adding signals 250*a*–250*d* mentioned in connection with FIG. 16B are fed to the gate terminals of the switching gate 254, thereby determining the energizing current and the winding to which the voltage level signal 185 is applied from the speed detector 117. That is, the switching gate 254 causes a flow of energizing current in the windings other than the one for rotation determined by the distributor 217 and applies to the step motor 5 a deceleration torque which is so set as to be expressed by the formula $$\left(D' \frac{d\theta}{dt}\right)$$

determined in accordance with the speed ($d\theta/dt$) of the rotor of the step motor 5 at that moment.

Figure 16D:
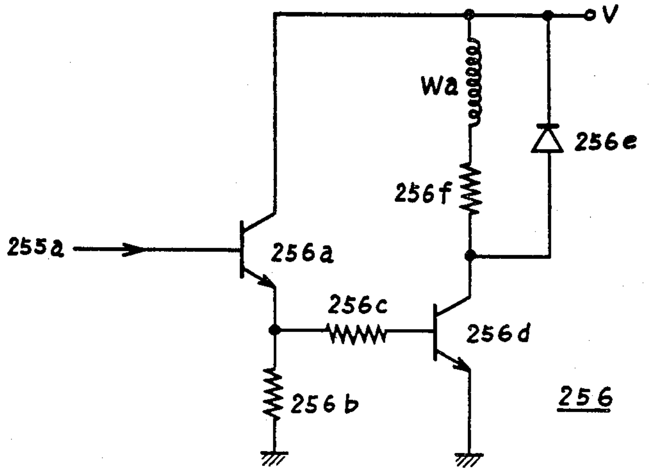

FIG. 16D illustrates one energizing circuit 256 alone of the winding drive part 222 related to the energizing-signal output terminal 255*a* shown in FIG. 16C. In this electronic typewriter, an energizing circuit of the same configuration is employed for each of other output terminals 255*b*–255*d*. In FIG. 16D, the base of a transistor 256*a* is connected to the output terminal 255*a* with its collector connected to a power supply, and its emitter is grounded via a resistor 256*b* while being connected to the base of a transistor 256*d* via a resistor 256*c*. The emitter of the transistor 256*d* is grounded, and its collector is connected to the power supply via a diode 256*e* while being connected thereto via a series circuit consisting of a resistor 256*f* and a coil Wa of the energizing pole W of the step motor 5 so that, when an energizing signal is applied to the transistor 256*a*, a current comes to flow in the coil Wa. And when driven by the output of the switching gate 254, the circuit functions as an A-class amplifier in the manner that the deceleration torque generated at that moment becomes proportional to the speed as mentioned.

Referring now to the block diagram of FIG. 17, the action of the control part 209 for controlling the above motor drive part 216 will be described in detail. An up-down counter 257 counts the number of steps driven forward or backward from the home position of the rotor of the step motor 5 or the print wheel 3 at each moment, namely, the displacement thereof equivalent to the number of type elements 2 spaced apart from the home position. This counter receives a count-up pulse signal 152 and a count-down signal 153 from the up-down pulse circuit 114 shown in FIG. 11, and counts up in response to the clockwise (CW) rotation of the rotor of the step motor 5 or counts down in response to the counterclockwise (CCW) rotation thereof. And the counted value is cleared to zero automatically when an initializing signal 207 and home-position indicating signal 129 are generated by the action of the initializing circuit of FIG. 15 performed immediately after switching on the power supply for the entire typewriter, and also when the counted value reaches 96 after completion of one cycle. A comparate logic circuit 259 receives the counted value 258 of the up-down counter 257 and the alpha-numeric signal 105 from the buffer register 101, then detects the present position and the destinating position of the rotor of the step motor 5 or the print wheel 3, and computes the shortest distance between the two positions and the direction thereof to produce an error signal 260 and a direction signal 183.

Figure 18:
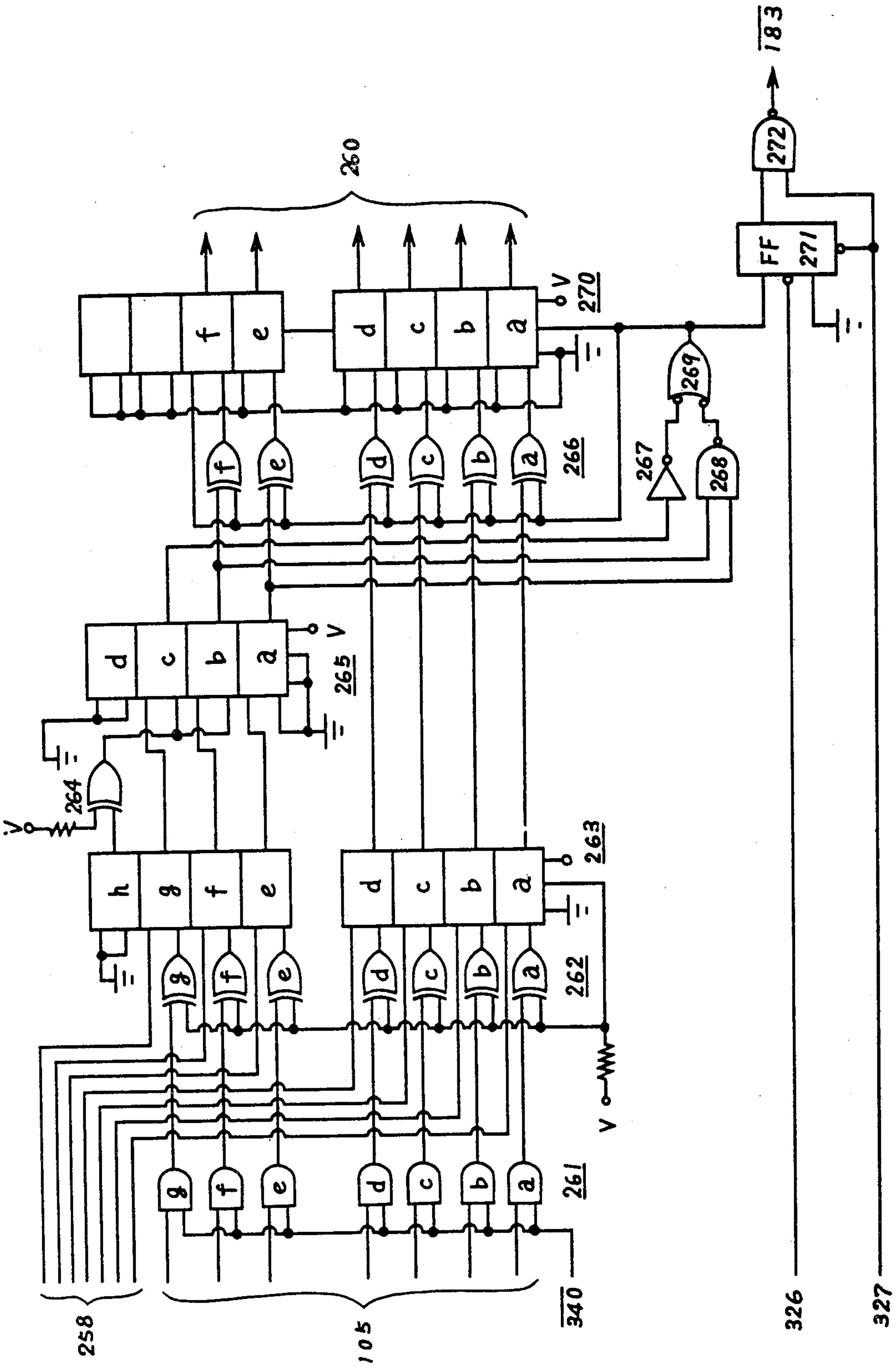
FIG. 18 is a circuit diagram showing the details of a comparate logic circuit in the control part.

The details of the comparate logic circuit 259 are shown in FIG. 18, wherein a binary-coded alpha-numeric signal 105 from the buffer register 101 is fed to AND gates 261*a*–261*g* controlled by a selecting gate signal 340 obtained from a start-stop circuit 300 (to be described afterward). The outputs of the AND gates 261*a*–261*g* are converted into two's complements by INHIBIT OR gates 262*a*–262*g* respectively and then are fed to individual digits 263*a*–263*g* of a full adder 263. The counted value 258 of the up-down counter 257 is fed to the digits 263*a*–263*g*, wherein the least significant digit 263*a* receives always a carry signal while the most significant digit 263*h* receives a carry signal merely from the adjacent lower digit 263*g* alone.

The results of addition in the lower four digits 263*a*–263*d* of the full adder 263 are fed to INHIBIT OR gates 266*a*–266*d* respectively, while the results of addition in the upper three digits 263*e*–263*g* except the most significant digit 263*h* are fed to the lower three digits 265*a*–265*c* of a full adder 265 respectively. The content of the most significant digit 263*h* is fed to one input terminal of an INHIBIT OR gate 264 whose other input terminal is connected to a power supply. The output of the INHIBIT OR gate 264 is fed to the digits 265*b* and 265*c* of the full adder 265, in which one input terminal of the least significant digit 265*a* and the both input terminals of the most significant digit 265*d* are grounded.

The output of the digit 265*c* of the full adder 265 is fed to an OR gate 269 via an inverter 267, and the outputs of the digits 265*a* and 265*b* are fed to an OR gate 269 via an AND gate 268 and also to INHIBIT OR gates 266*e* and 266*f* respectively. The output of the OR gate 269 controls INHIBIT OR gates 266*a*–266*f* and simultaneously serves as a carry signal to the least significant digit 270*a* of a full adder 270, and further serves as a set input to FF 271 to form a direction signal 183.

The outputs of the INHIBIT OR gates 266*a*–266*f* are fed individually to one input terminal of each of the digits 270*a*–270*f* of the full adder 270 whose other input terminals are grounded with the exception of the most significant digit 270*f*, to which the output of the OR gate 269 is fed. And the outputs of the digits 270*a*–270*f* form an error signal 260. In FF 271 whose reset input terminal is grounded, a load signal 326 from the start-stop circuit 300 is fed to its trigger terminal, and a selecting signal 327 from the circuit 300 is fed to its clear input terminal. The set output of FF 271 is fed with the selecting signal 327 to an AND gate 272, which then generate a direction signal 183.

The action of such comparate logic circuit 259 is described in detail also in the U.S. Pat. No. 3,858,509. Summarizing the action, when the number of steps required for rotating the rotor of the step motor 5 clockwise from the home position to the destinating position exceeds 48 to reach, for example, 65, then the direction signal 183 is turned to a low level so as to indicate counterclockwise rotation, and the content of the error signal 260 is rendered equivalent to 31 steps.

Referring to FIG. 17 again, the error signal 260 thus obtained is latched by the latch circuit 273, whose content is then fed to an error-one circuit 274, an error-two circuit 275, a down counter 276, a trigger timing circuit 277, an operating circuit 278 and a divider 279. The error-one circuit 274 and the error-two circuit 275 generate a one-step signal 280 and a two-step signal 281 respectively when the number of steps required for rotating the rotor of the step motor 5 from the start position to the destinating position is one or two. And the two-step signal 281 is fed to both a last signal circuit 282 for forming a last drive pulse 283 and a deceleration circuit 284 for forming a deceleration indicating signal 220.

The down counter 276 is first set to the content latched by the latch circuit 273 and subsequently receives a drive pulse signal, thereby counting down the content every time the step motor 5 is driven by one step and feeding the counted value to the trigger timing circuit 277. And when the value reaches one or zero, a count-one signal 285 or a count-zero signal 286 is generated. The operating circuit 278 has a function to generate a constant speed signal 287, which indicates that acceleration-deceleration control is not necessary for rotation of the rotor of the step motor 5, in accordance with the content latched by the latch circuit 273. In case the acceleration-deceleration control is necessary, the boundary between the acceleration range "a" and the deceleration range "b" described in connection with FIG. 5 should be indicated according to the number of required steps. For this purpose, the operating circuit 278 computes the number of steps representing the distance of the boundary from the middle point of the entire stroke, and feeds an operated value 288 to an adder 289. Besides this operated value 288, the adder 289 also receives the output of the divider 279 which computes a half of the entire stroke, and after summing the number of steps required up to the boundary, feeds the result to an operator 290. The divider 279 computes a half of the latched content by eliminating the least significant digit thereof and generates a numerical output not exceeding the half in case the latched content is odd.

Figure 19A:
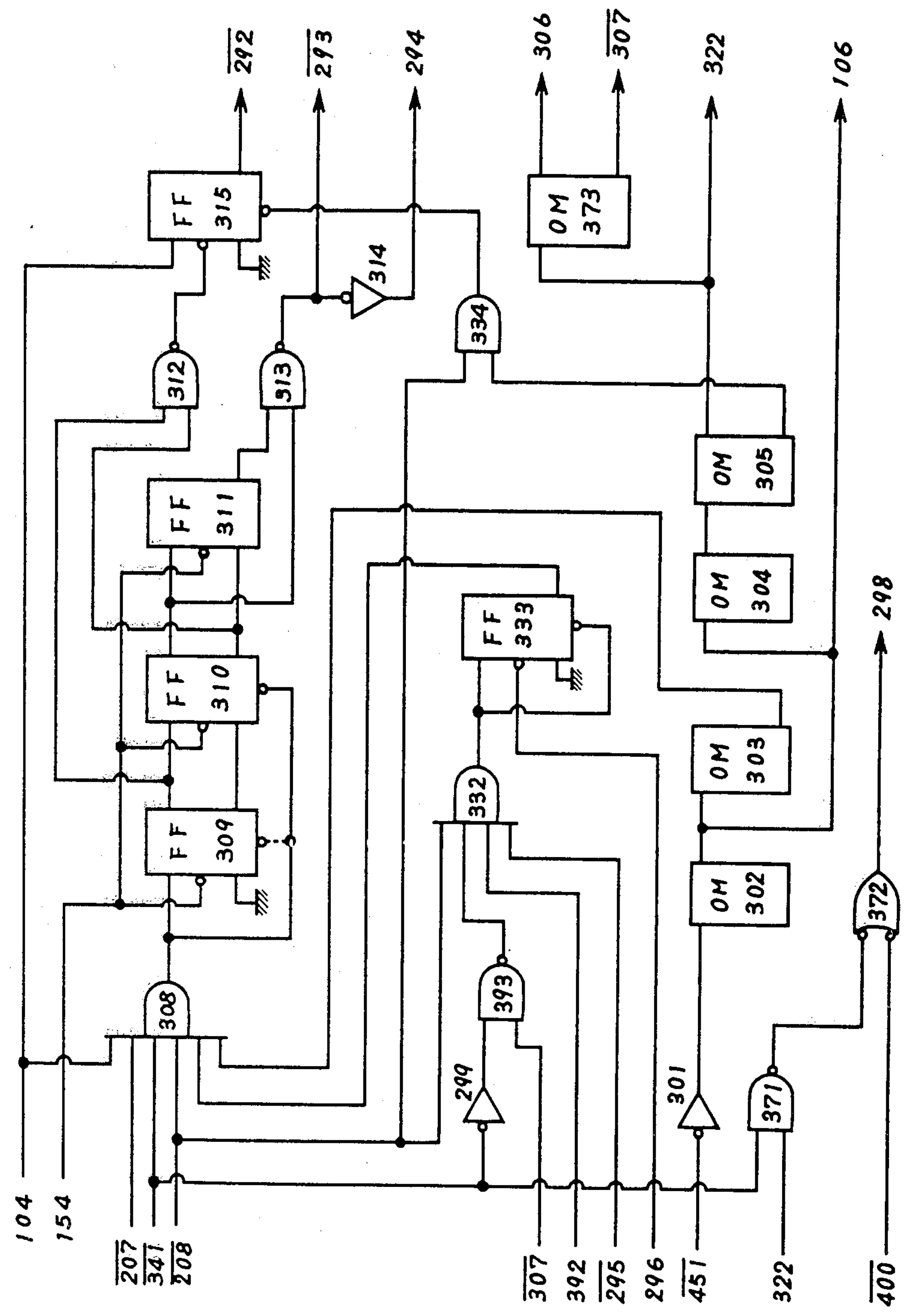
FIGS. 19A and B are circuit diagrams showing in division the details of a start-stop circuit.
Figure 19B:
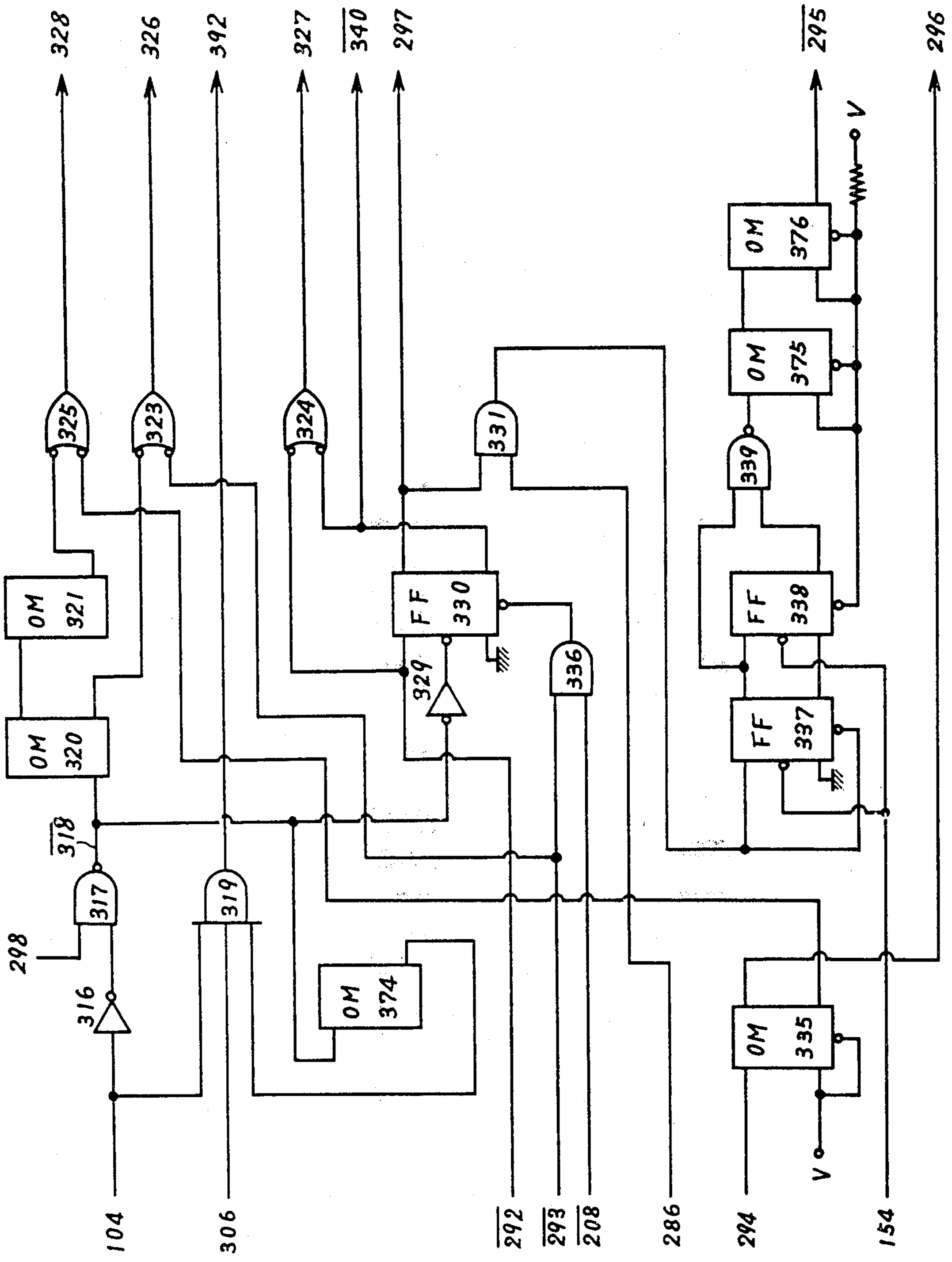

The details of the start-stop circuit 300 are illustrated in FIGS. 19A and 19B. An AND gate 308 receives an output ready signal 104 from the buffer register 101, an initializing signal 207 and an initial reset signal 208 from the initializing circuit, a repeat indicating signal 341 from a trigger timing circuit 277 (to be described afterward), a reset output of FF 333 and an output of OM 303. And the ouput of the AND gate 308 is fed as a set input and a clear input to FF 309, and also as a clear input to FF 310. The outputs of FF 309 are fed directly fo FF 310, whose outputs are then fed directly to FF 311 in series. Both the set output of FF 309 and the reset output of FF 310 are fed to an AND gate 312, while the set output of FF 310 and the reset output of FF 311 are fed to an AND gate 313. Each of FF 309, 310 and 311 is triggered by a clock pulse 154. The FF 315 is set by the output ready signal 104 and is triggered by the output of the AND gate 312. The reset input terminal of FF 315 is grounded, and the output of an AND gate 334 is fed to its clear input terminal. The reset output 292 of FF 315 serves as a set input to FF 330 and is also fed as an input to an OR gate 324.

The output of an AND gate 313 becomes a signal 293 which is fed directly to an OR gate 323 and an AND gate 336. The signal 293 is inverted by an inverter 314 to form a trigger signal 294 to OM 335. A repeat indicating signal 341 is fed via an inverter 299 to an AND gate 393, which also receives the reset output 307 of OM 373. The output of the AND gate 393 is fed to an AND gate 332 with the initial reset signal 208, the output 392 of AND gate 319 and the output of OM 376. And the output of AND gate 332 serves as a set input to FF 333 and as a clear input thereto, and the set output 296 of OM 335 is fed to the trigger input terminal of FF 333.

The trigger drive signal 451 for the hammer drive part 211 is fed to OM 302 via an inverter 301. Then OM 302 generates a damping signal 106 which is fed to the buffer register 101 and simultaneously serves to trigger OM 303 and 304. Subsequently OM 304 triggers OM 305, which feeds its set output 322 to OM 373 and an AND gate 371. The reset output of OM 305 is fed to an AND gate 334 with the initial reset signal 208. An AND gate 371 receives the repeat indicating signal 341 and generates an output which is fed to an OR gate 372 with a repeat return signal 400. The output 298 of OR gate 372 is fed to an AND gate 317 with the output ready signal 104 inverted via an inverter 316, and the output 318 of AND gate 317 is fed directly to OM 320 and 374 and is also fed via an inverter 329 as a trigger input to FF 330. The set output of OM 320 is fed to OM 321, while the reset output thereof is fed to an OR gate 323 which generates a load pulse 326. The output of OM 321 is fed with the output of OM 335 to an OR gate 325, which then generates a start pulse 328. An AND gate 319 receives the output ready signal 104, the set output 306 of OM 373 and the output of OM 374.

The clear input terminal of FF 330 receives the output of an AND gate 336 to which the initial reset signal 208 is fed, and a return-gate signal 297 as the set output of FF 330 is fed to an AND gate 331 with a count-zero signal 286. The FF 330 further generates a selecting-gate signal 340 as its reset output, which is fed to an OR gate 324 whose output is a selection signal 327. The output of AND gate 331 serves as a set input to FF 337 and as a clear input thereto, and the outputs of FF 337 are fed directly to FF 338. And both the set output of FF 337 and the reset output of FF 338 are fed to an AND gate 339. Each of FF 337 and 338 is triggered by a clock pulse 154. The output of AND gate 339 triggers OM 375, and the output of OM 375 triggers OM 376 respectively.

Figure 20:
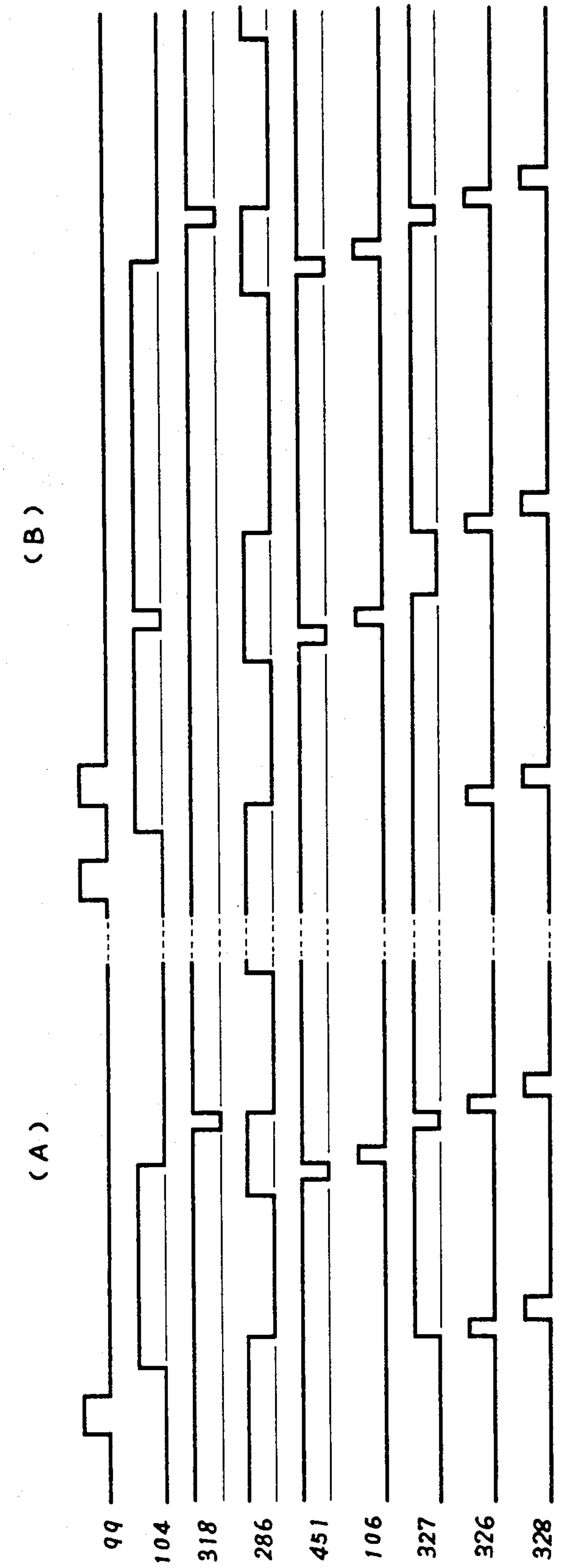
FIG. 20 illustrates the waveforms of signals associated with the start-stopcircuit at FIG. 19.

The output signals of the individual parts in the start-stop circuit 300 of the above configuration are shown in FIG. 20 (A) and (B), wherein (A) represents the case where returning the print head 1 is performed immediately after printing action, and (B) represents the case where bringing a next type element 2 is performed in succession to one printing action without returning the print head 1. The reference numerals denoting the output waveforms are the same as those used for the signals in the circuit diagram.

In the start-stop circuit 300, as is obvious from the waveform chart, a load signal 326 and a selection signal 327 are generated upon arrival of an output ready signal 104 from the buffer register 101, and also a start pulse 328 (for starting the step motor 5 as will be described afterward) is generated. Subsequently, a damping signal 106 is generated in response to arrival of a count-zero signal 286 from the down-counter 276 and a trigger drive signal 451 for the hammer drive part 211. The output ready signal 104 is once inverted, and when this signal is not turned to a high level even after the lapse of a predetermined time, that is, when no alpha-numeric data is fed to the buffer register 101, a return-trigger signal 318 is generated from the AND gate 317 to compare the present position with the home position, and simultaneously a start pulse 328 is generated from the OR gate 325 to start returning to the home position.

To the contrary, when the output ready signal 104 is turned to a high level within the predetermined time, that is, when the next alpha-numeric signal 105 is stored in the buffer register 101, the AND gate 317 is prevented from triggering the OM 320 so that no returning action to the home position is performed and, in accordance with change of the output ready signal 104 to a high level, selection of the next type element is effected in response to the alpha-numeric signal 105. The repeat indicating signal 341 is used for preventing the AND gate 308 from setting the FF 309 so as to prohibit the returning action when the same alpha-numeric printing is executed by the repeat key 30. And in process of releasing the depressing force from both the alpha-numeric key 26 and the repeat key 30, the repeat return signal 400 permits start of the returning action to the home position without effecting the printing action successively when the repeat key 30 alone is left in the depressed state for a short time.

Referring to FIG. 17 again, the start pulse 328 produced in the start-stop circuit 300 and the AD pulse signal 170 are fed to the up-counter 344 via an OR gate 342 and an AND gate 343. The content of the up-counter 344 is fed sequentially to the operator 290, which turns its output 291 to a high level when the total pulses of the start pulse 328 and the AD pulse signal 170 reaches the number of steps obtained from the adder 289 to indicate the boundary, so that transmission of the pulses from the AND gate 343 is interrupted via an inverter 345, thereby stopping the action of the up-counter 344 while controlling a drive-pulse forming part 346 by the high-level output 291.

Figure 17:
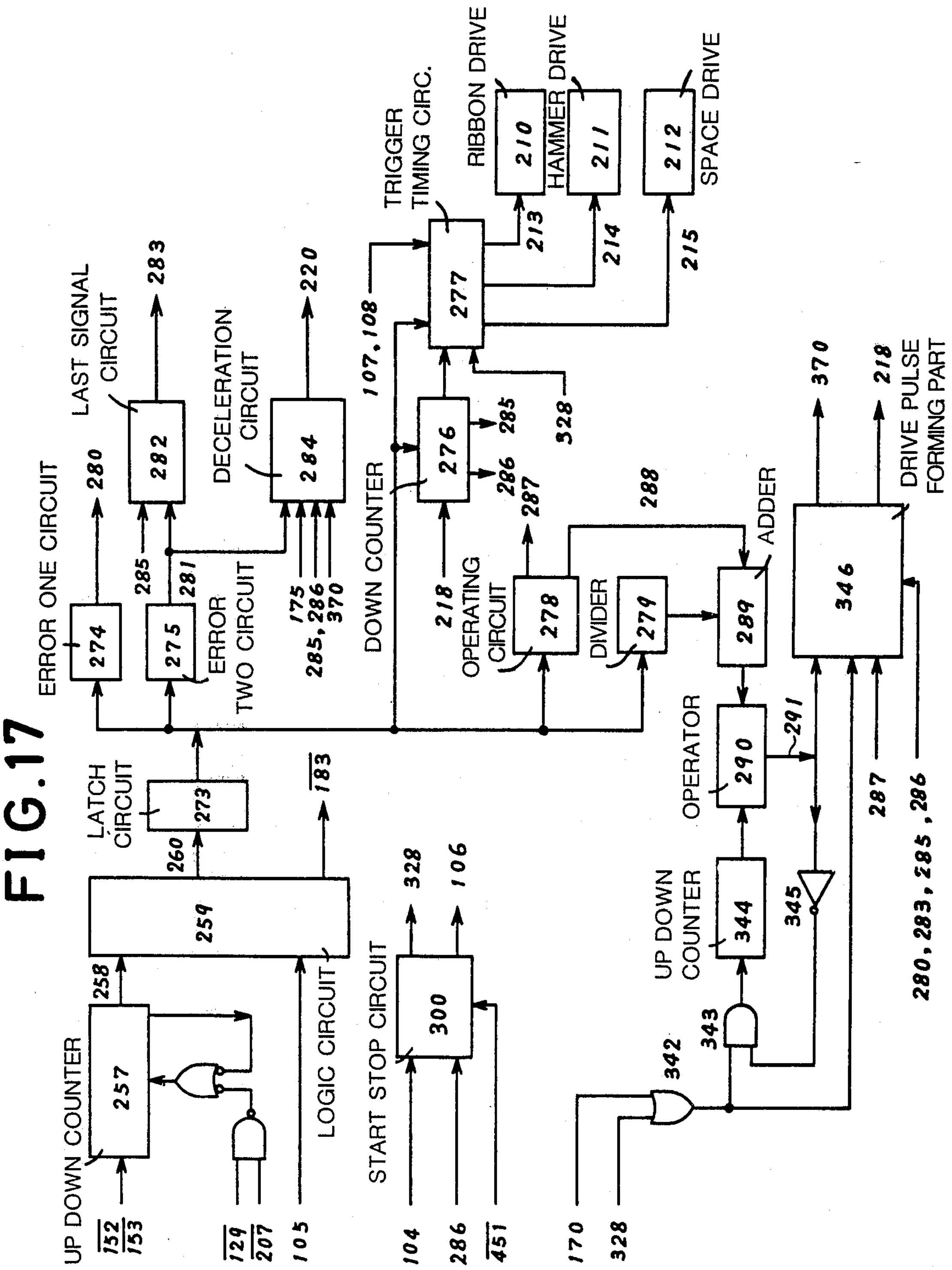
FIG. 17 is a block diagram for explaining the outline of a control part for controlling the step-motor drive part.
Figure 21:
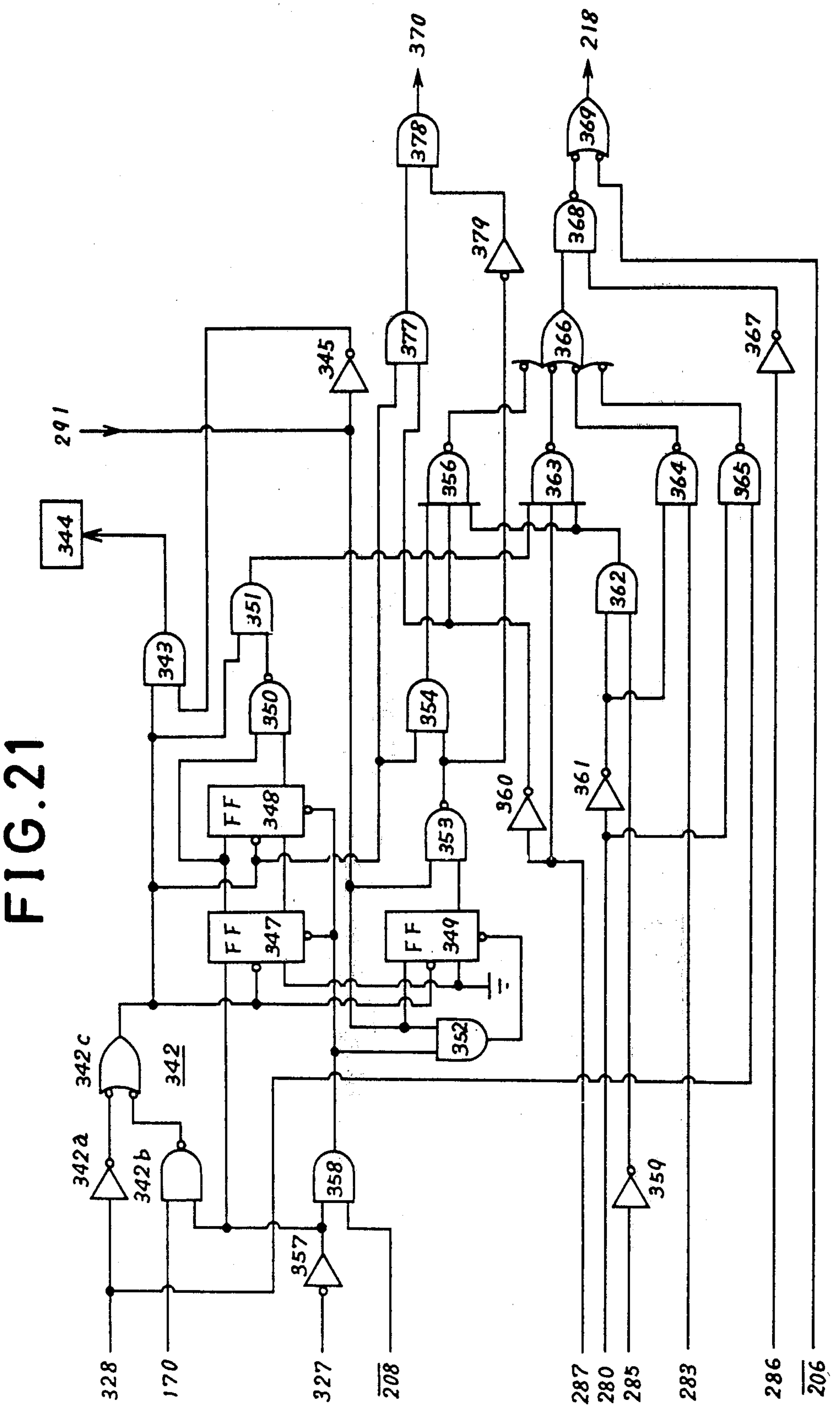
FIG. 21 is a circuit diagram showing the details of a drivepulse forming part.

FIG. 21 illustrates the details of the drive-pulse forming part 346, wherein, although an AND gate 343 and an inverter 345 are the same as those shown in FIG. 17, an OR gate 342 therein is shown as the combination consisting of an inverter 242*a* to receive the start pulse 328, and AND gate 342*b* to receive the selection signal 327 via an inverter 357 and also the AD pulse signal 170, and an OR gate 342*c* to receive the outputs of both the inverter 342*a* and the AND gate 342*b*. The added output of the OR gate 342 serves as a trigger signal to FF 347, 348 and 349 and is also fed to AND gates 351, 354 and 377. The selection signal 327 is fed via an inverter 357 as the set input to FF 347, whose reset input terminal is grounded and the outputs thereof are fed directly to FF 348. And both the set output of FF 347 and the reset output of FF 348 are fed to an AND gate 350, whose output is then fed to an AND gate 351.

An AND gate 358 receives the selection signal 327 via an inverter 357 and the initial reset signal 208, and generates an output which is fed as the clear input to FF 347 and 348 and also is fed to an AND gate 352. The output 291 of the operator 290 is fed to an AND gate 352 and 353 and is fed as the set input to FF 349, and the output of AND gate 352 is fed as the clear input to FF 349, whose reset input terminal is grounded. The reset output of FF 349 is fed to an AND gate 353, whose output is then fed to an AND gate 354 and an inverter 379. The output of the AND gate 354 is fed to an AND gate 356, while the output of the inverter 379 is fed with the output of an AND gate 377 to an AND gate 378, whose output forms a boundary pulse 370.

A constant-speed signal 287 is fed to an AND gate 363 directly and also to AND gates 356 and 377 via an inverter 360; a one-step signal 280 is fed directly to an AND gate 365 and also to AND gates 362 and 364 via an inverter 361; a count-one signal 285 is fed to an AND gate 362 via an inverter 359; a last drive pulse 283 is fed to an AND gate 364; a start pulse 328 is fed to an AND gate 365; a count-zero signal 286 is fed to an AND gate 368 via an inverter 367; and an initial drive pulse 206 is fed to an OR gate 369. The output of the AND gate 362 is fed to the AND gates 356 and 363, to which the output of AND gate 351 is also fed. The outputs of AND gates 356, 363, 364 and 365 are fed to the OR gate 366, whose output is then fed to the AND gate 368. And the output of the AND gate 368 is fed to the OR gate 369 which generates a drive pulse signal 218.

Figure 22:
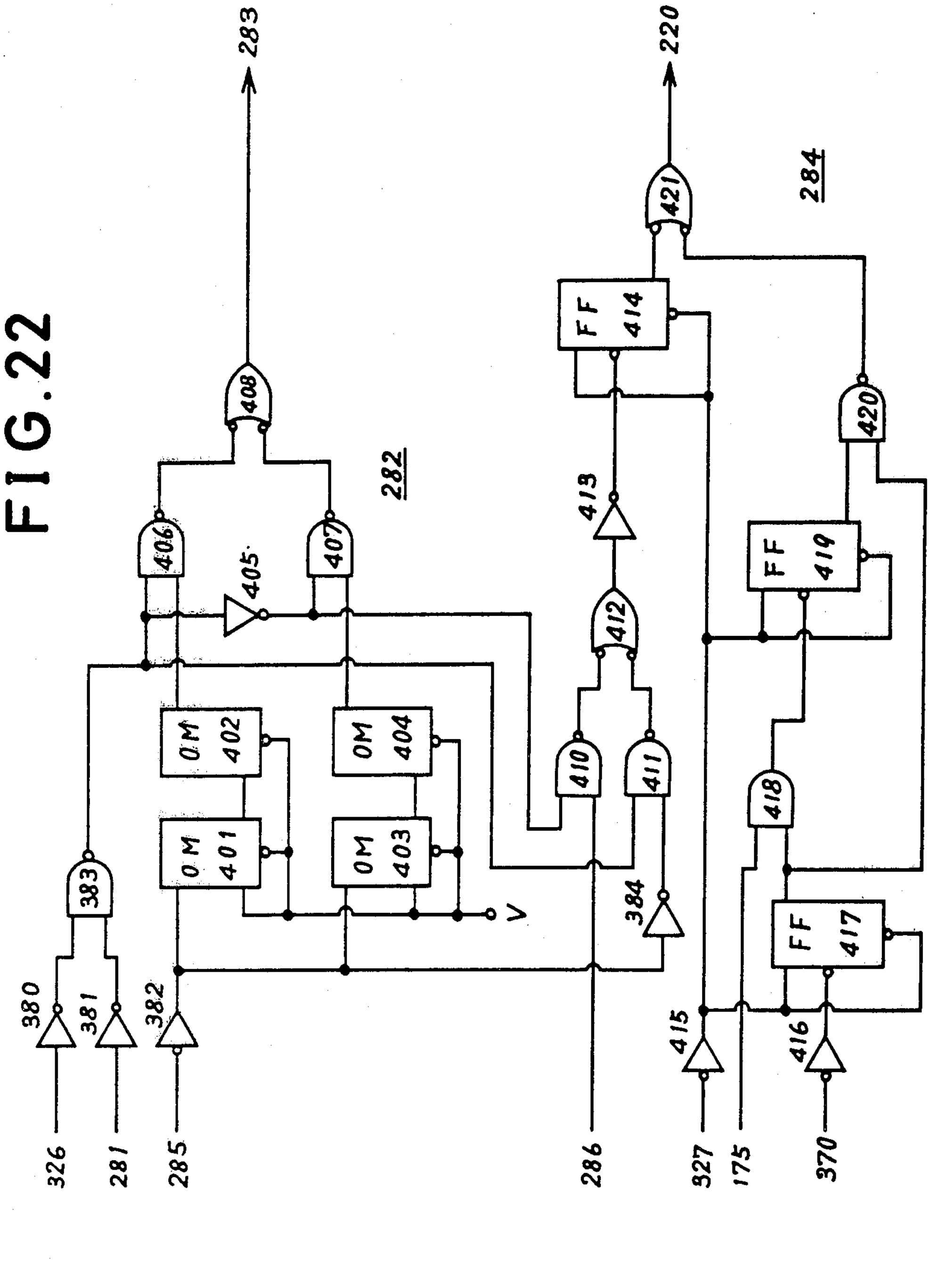
FIG. 22 is a circuit diagram showing the details of a last-signal forming circuit and a deceleration indicating circuit.

FIG. 22 illustrates the details of the last-signal forming circuit 282 and the deceleration indicating circuit 284, wherein a load signal 326 and a two-step signal 281 are fed to an AND gate 383 via inverters 380 and 381 respectively, and the output of the AND gate 383 is fed to AND gates 406 and 411 directly and also to AND gates 407 and 410 via an inverter 405. The count-one signal 285 is fed to OM 401 and 403 via an inverter 382, and also to an AND gate 411 further via an inverter 384. The outputs of OM 401 and 403 are fed respectively to OM 402 and 404, whose outputs are then fed to AND gates 406 and 407 respectively. The outputs of the AND gates 406 and 407 are fed to an OR gate 408, whose output forms a last drive pulse 283.

The count-zero signal 286 is fed to an AND gate 410, and the outputs of both AND gates 410 and 411 are fed to an OR gate 412, whose output is fed via an inverter 413 to form a trigger signal to FF 414. The selection signal 327 is fed via an inverter 415 as the set and clear input to FF 414, 417 and 419. The boundary pulse 370 is fed via an inverter 416 as the trigger input to FF 417, whose output is then fed to an AND gate 420 and also fed with the speed indicating signal 175 to an AND gate 418. The output of the AND gate 418 is fed as the trigger input to FF 419, whose output is then fed to an AND gate 420. The output of the AND gate 420 is fed with the output of FF 414 to an OR gate 421, whose output serves as a deceleration indicating signal 220.

The last-signal forming circuit 282 and the deceleration indicating circuit 284 of the above configuration perform the action in the following manner. The last drive pulse 283 in the circuit 282 is generated out of the count-one signal 285 with delay of a predetermined time by the OM 401 and 402 or the OM 403 and 404. As will be apparent with reference to the waveform chart of FIG. 23, the last drive pulse 283 serves as a last pulse 218*k* of the drive pulse signal 218 formed until then according to the AD pulse signal 170. Since the rotation of the rotor of the step motor 5 is in a constant low-speed mode immediately before stopping as mentioned before, generation of the last pulse 218*k* is effected with delay of a pedetermined time as compared with a last pulse 170*k* of the AD signal 170 produced at equal intervals corresponding substantially to the maximum pull-in pulse rate.

In the deceleration indicating circuit 284, when the two-step signal 281 is at a high level, that is, in case a desired type element 2 on the print wheel 3 is merely a two-step rotation from the printing position, the deceleration indicating signal 220 is turned to a high level by the count-one signal 285. To the contrary, when the two-step signal 281 is at a low level, the deceleration indicating signal 220 is maintained at a high level during the period from arrival of the boundary pulse 370 to arrival of the speed indicating signal 175, that is, within the deceleration range "b" described in connection with FIG. 5, and also is turned in response to the count-zero signal 286. And when the deceleration indicating signal 220 is at a high level, a deceleration torque is applied to the step motor 5 in proportion to the speed thereof while the deceleration indicating signal 220 is maintained at a high level.

Figure 23:
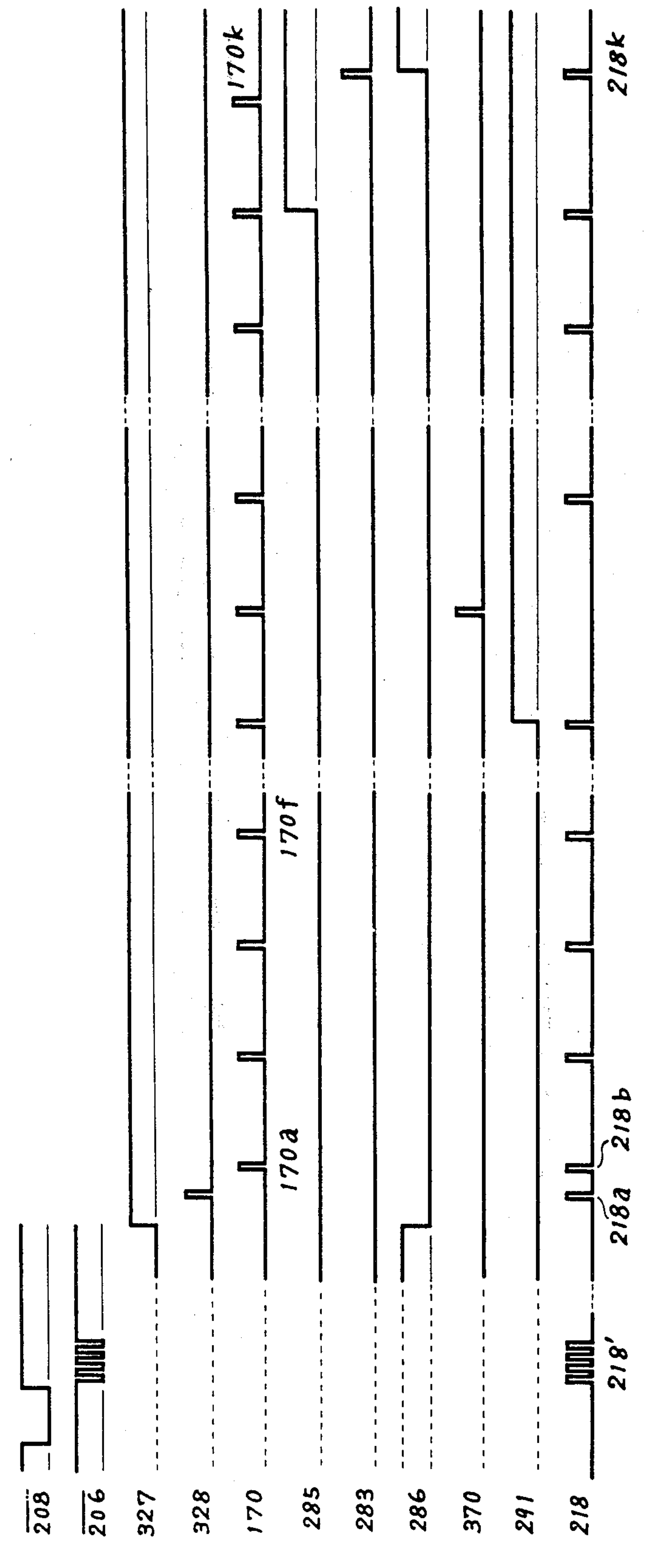
FIG. 23 illustrates signal waveforms for explaining how the step-motor drive pulses are formed.

Referring now to FIG. 23, formation of the drive pulse signal 218 will be explained in relation to the above drive-pulse forming part 346, last-signal forming circuit 282 and deceleration indicating circuit 284. In this waveform chart the intervals of the pulse of AD pulse signal 170 are shown uniformly, although such intervals vary actually to be wider or narrower. First, at turn-on of the power supply the initial drive pulse 206 from the initializing circuit mentioned in connection with FIG. 15 is fed to the OR gate 369, so that a drive pulse 218' is produced in order to rotate the rotor of the step motor 5 to the home position. Subsequently, when a start pulse 328 is generated in the start-stop circuit [illegible] by depression of an alpha-numeric key 26 on the key-board 25, the pulse 328 is formed into a first drive pulse 218*a* by way of OR gate 342, AND gate 354, AND gate 356, OR gate 366, AND gate 368 and OR gate 369 of the drive-pulse forming part shown in FIG. 21, thereby starting the rotor of the step motor 5 toward the designating position.

Then, as already explained in connection with FIGS. 10 and 12, an AD pulse signal 170 is generated before the rotor of the step motor 5 is rotated to the next stable point according to the first drive pulse 218*a*, that is, at the position thereof posterior by ¼ step to the start position (anterior by ¾ step to the next stable point). The first AD pulse 170*a* is formed into a second drive pulse 218*b* by way of the OR gate 342 through the OR gate 369 similarly to the preceding start pulse 328, thereby further rotating the rotor of the step motor 5. And subsequently, AD pulse signal 170 are generated in the same manner to produce a drive pulse signal 218.

During rotation of the rotor of the step motor 5 by the drive pulse signal 218 thus obtained, when the boundary between the acceleration range and the deceleration range is detected by the operator 290, a detection signal 291 is generated therefrom to invert the output of the AND gate 353, thereby preventing passage of the AD pulse signal 170 through the AND gate 354 and causing the AND gate 378 to produce a pulse which serves as a boundary indicating signal. However, passage of the AD pulse signal 170 being prevented by the AND gate 353 is permitted instantly as the fall of the pulse 170*f* thereof triggers FF 349, so that eventually the signal prevented from passing through the AND gate 354 is only the pulse 170*f* immediately after the boundary, and therefore the following pulses are put out as drive pulse signal 218 again. And due to prevention of the AD pulse 170*f*, the drive signal 218 that has been so generated earlier by ¾ step than the time of arrival at each destinating stable point, as to drive the rotor of the step motor 5 from the position anterior to the destinating stable point by 7/4 step to the position anterior thereto by ¾ step comes to be put out with delay of ¼ step to the destinating stable point, hence driving the rotor of the step motor 5 from the position anterior to the destinating stable point by ¾ step to the position posterior thereto by ¼ step.

Subsequently, when a count-one signal 285 is generated from the down counter 276, an AD pulse 170*k* appearing after that is prevented from passing through the AND gate 356 by the AND gate 362, and instead a last drive pulse 283 is transmitted by way of AND gate 364, OR gate 366, AND gate 368 and OR gate 369 to form a last drive pulse 218*k*.

When the constant speed signal 287 is present to signify that acceleration-deceleration control of the step motor 5 is not necessary, the start pulse 328 is not permitted to pass through the AND gate 356 but is transmitted by way of AND gates 351 and 363, OR gate 366, AND gate 368 and OR gate 369 to form a first drive pulse 218. However, the first of AD pulse signal 170 generated successively is prevented from passing through the AND gate 351 by the condition of FF 347 and 348, so that the second of AD pulse signal 170 and the following ones are formed into drive pulse signal 218. In the same manner as in the state subsequent to the boundary in the acceleration-deceleration control described previously, the pulse of AD pulse signal 170 generated at a position behind the stable point by ¼ step is formed into a drive pulse signal 218 which drives the rotor of step motor from the position anterior to the destinating stable point by ¾ step to the position posterior thereto by ¼ step.

In case the one-step signal 280 is present, the start pulse 328 alone is formed into a drive pulse signal 218 by the AND gate 365.

Now a detailed explanation will be given on how the step motor 5 is driven by the drive pulse signal 218 formed out of the AD pulse signal 170. As already described, the step motor 5 employed in this embodiment has a four-pole structure equipped with poles W, X, Y and Z and adopts dual phases energization system. It is known that when such step motor is driven by a single pulse from one stable point $\theta 0$ to the next stable point $\theta 1$, the energy applied to the rotor of the step motor corresponds to the area of a shaded portion Sa defined by a curve C1 in the torque curve characteristic graph of FIG. 24 (A), in which the abscissa denotes the distance $\theta$ and the ordinate denotes the torque T respectively.

In this embodiment, if the rotor of the step motor 5 being kept at a stable point $\theta 2$ determined by the poles Z and W receives rotatory energy according to a torque curve C3 when an energizing signal is applied to the poles W and X by the start pulse 328, then the rotor of the step motor 5 starts rotation to a stable point $\theta 3$ determined by these two poles. However, since the first of AD pulse signal 170 is generated during this rotation to a stable point $\theta 3$ as mentioned before, energization is shifted from the poles W and X to the poles X and Y at a position anterior to the stable point $\theta 3$ by ¾ step, and therefore the poles X and Y are energized at the position anterior to the stable point $\theta 3$ by ¾ step before the poles W and X reach there. Thus, the rotor of the step motor 5 receives rotatory energy according to a torque curve C4 and is thereby rotated toward a stable point $\theta 4$ determined by the poles X and Y. In the same manner, energization is shifted by the next pulse of AD pulse signal 170 from the poles X and Y to the poles Y and Z to continue the rotation. Consequently, each of the rotatory energy applied to the rotor of the step motor at these time becomes respectively such as shown the area of a shaded portion in FIG. 24 (B), wherein the area of a shaded portion Sb represents the energy caused by the start pulse 328, and that of a shaded portion Sc represents the energy caused by the AD pulse signal 170 respectively. As the rotatory energy resulting from the AD pulse signal 170 is greater than that shown in FIG. 24 (A), the rotor of the step motor 5 is accelerated by such greater energy.

Figure 24:
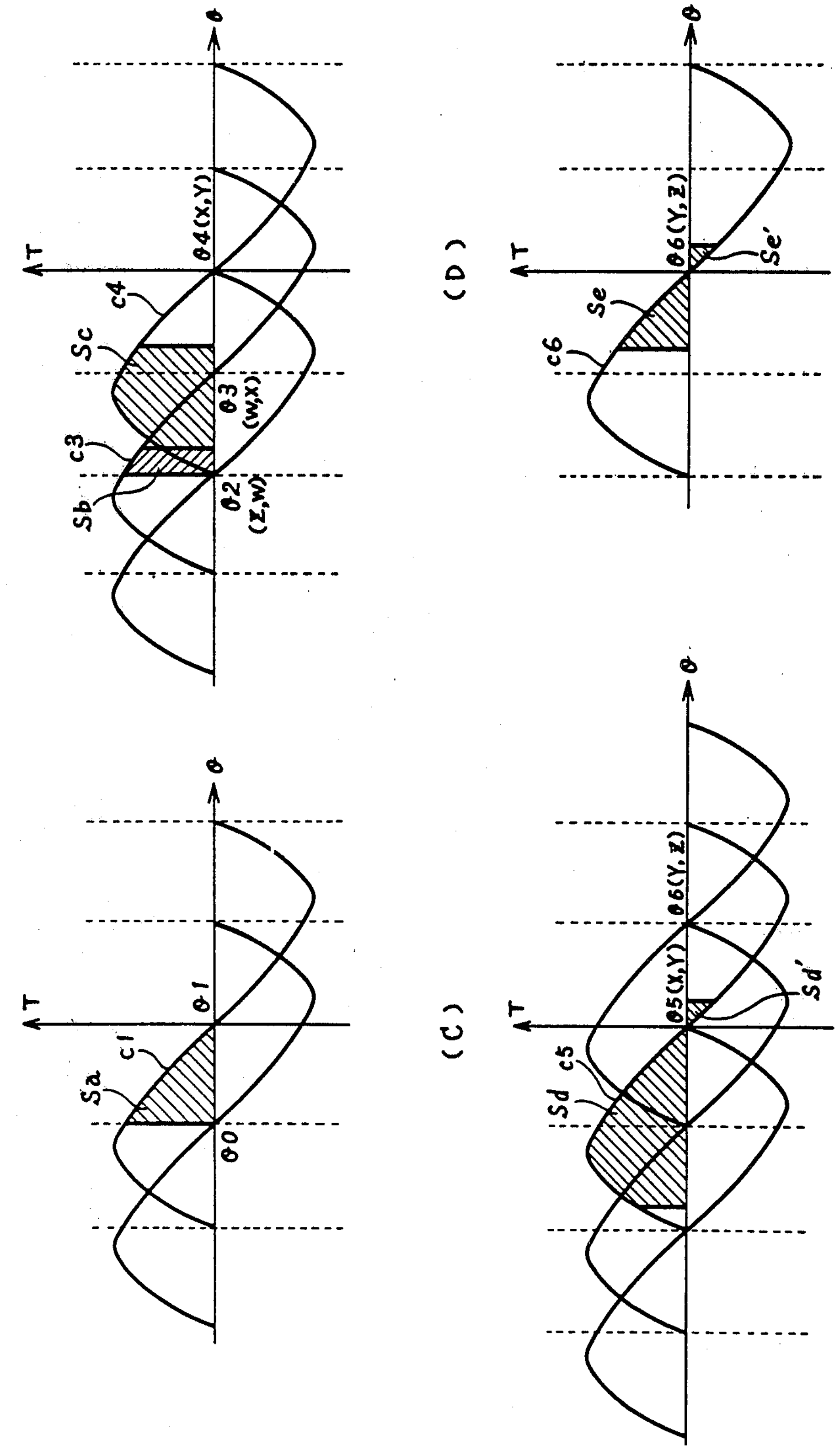
FIGS. 24 (A), (B), (C) and (D) graphically represent the quantities of rotatory energy applied to the step motor.

At the boundary between the acceleration range and the deceleration range, one pulse of the AD pulse signal 170 is removed. If the driving moment by the poles X and Y is coincident with the boundary during the process of sequentially switching the energized windings in the order of poles W and X—X and Y—Y and Z—Z and W, the next pulse of AD pulse signal 170 for applying the energizing signal to the poles Y and Z has not arrived yet, so that the rotation is maintained by the same rotatory energy driving the poles X and Y according to a torque curve C5 even after passing over the switching point. The poles Y and Z are energized by the next pulse of AD pulse signal 170 at the position posterior by ¼ step to a stable point $\theta 5$ determined by the poles X and Y, and after one-step rotation, the poles Z and W are energized at the position posterior by ¼ step to a stable point $\theta 6$ determined by the poles Y and Z. Consequently, the rotary energy applied during the period from start of energization of the poles X and Y to that of the poles Y and Z is represented by shaded portions Sd and Sd' in FIG. 24 (C). And the rotatory energy provided by energizing poles Y and Z is applied as shown in FIG. 24 (D) according to a torque curve C6 between the position anterior to the stable point $\theta 6$ by ¾ step and the position posterior thereby by ¼ step. Thus, as represented by shaded portions Se and Se', the rotatory energy becomes extremely smaller than applied during acceleration. And this is the energy required for the constant low-speed rotation in this embodiment and being proportional to the signal based on the pull-in pulse rate.

However, since a large force of inertia due to acceleration is applied to the rotor of the step motor 5, the rotatory energy held therein is actually far greater than the one illustrated. And, as the brake-torque adding circuit 219 is actuated by the acceleration indicating signal 220 of the deceleration circuit 284 described in connection with FIG. 22, a large deceleration torque other than that caused by the AD pulse signal 170 is applied to achieve quick reduction of the rotatory energy. Accordingly, in the deceleration range, the applied rotatory energy resulting from the AD pulse signal 170 is not effective at all practically, but it is necessary for attaining constant low-speed rotation after release of the deceleration torque. Moreover, such rotatory energy is necessary also in the case where the constant speed signal 287 is generated from the beginning. Thus, the AD signal 170 is utilized for attaining both the acceleration and the constant low speed.

Figure 25:
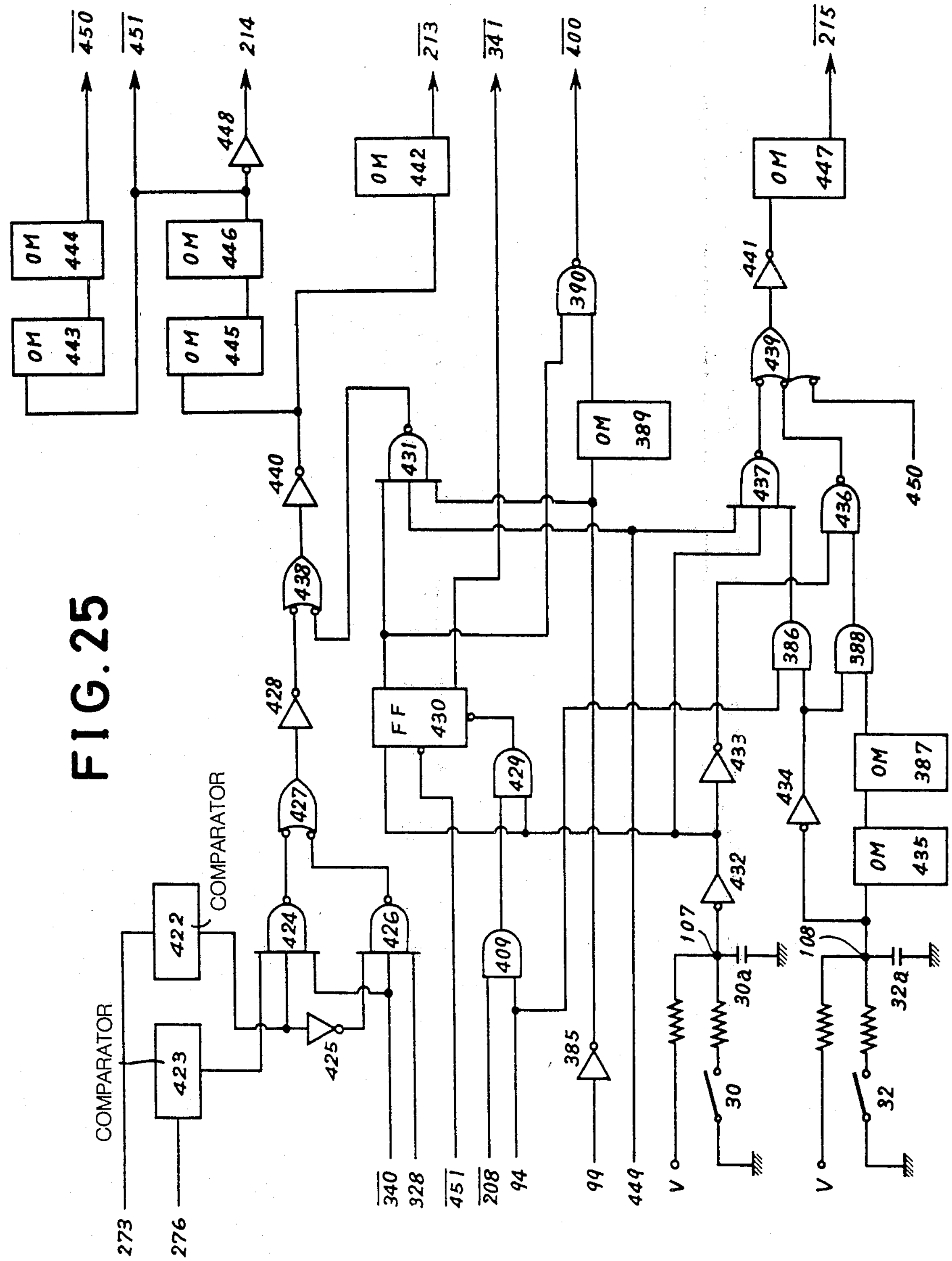
FIG. 25 is a circuit diagram showing the details of a trigger timing circuit.

FIG. 25 illustrates the details of the trigger timing circuit 277, wherein comparators 422 and 423 receives the content latched by the latch circuit 273 or the content of the down counter 276 respectively and compares the individual contents with preset values thereof which are equal to each other. If the content of the latch circuit 273 is below the preset value from the beginning, the output of the comparator 422 is inverted. To the contrary, if the said content is above the preset value, the output of the comparator 423 is inverted at the moment the output value of the down counter 276, which receives the said content and counts it down in accordance with rotation of the rotor of the step motor 5, comes to coincide with the preset value.

The output of the comparator 422 is fed to an AND gate 424 directly and also to an AND gate 426 via an inverter 425, while the output of the comparator 423 is fed to an AND gate 424 which also receives a selecting gate signal 340. The AND gate 426 receives both the start pulse 328 and the selecting gate signal 340, and the outputs of the AND gates 424 and 426 are fed to an OR gate 427, whose output is then fed via an inverter 428 to an OR gate 438 with the output of an AND gate 431. The output of the OR gate 438 is fed via an inverter 440 to a ribbon triggering OM 442 and a print-hammer triggering OM 445, and the output of OM 442 serves as a ribbon trigger signal 213 while the output of OM 445 is fed to OM 446, whose output becomes a hammer trigger drive signal 451 to be fed to a space triggering OM 443 and also becomes a hammer trigger signal 214 via an inverter 448. The output of OM 443 is fed to OM 444, whose output becomes a drive signal 450.

The repeat key 30 and the space bar 32 produce a repeat signal 107 and a space signal 108 respectively at one end of capacitors 30*a* and 32*a* connected thereto individually. The repeat signal 107 is fed via an inverter 432 to the set input terminal of FF 430 and AND gates 429 and 437, and is further fed via an inverter 433 to an AND gate 436. The space signal 108 serves as a trigger input to OM 435 and is also fed via an inverter 434 to AND gates 386 and 388. The hammer trigger drive signal 451 is fed to the trigger input terminal of FF 430, and the output of an AND gate 409 receiving both an initial reset signal 208 and a margin right signal 94 is fed to an AND gate 429, whose output is then fed to the clear input terminal of FF 430. The set output of FF 430 is fed to AND gates 431 and 390, while the reset output thereof becomes a repeat indicating signal 341.

The AND gate 431 further receives a clock pulse 449 of 20 Hz and a depressing signal 99 via an inverter 385, whose output also serves to trigger OM 389. The output of OM 389 is then fed to an AND gate 390, whose output becomes a repeat return signal 400. An AND gate 386 receives the margin right signal 94, while an AND gate 388 receives the output of OM 387 which is triggered by the output of OM 435. The output of the AND gate 386 is fed with the clock pulses 449 to an AND gate 437, and the output of the AND gate 388 is fed to an AND Gate 436. The outputs of both AND gates 436 and 437 are fed with the gate drive signal 450 to an OR gate 439, whose output is then fed via an inverter 441 to OM 447 which generates an output serving as a trigger signal 215.

The action of the trigger timing circuit 277 is performed in the following manner. First, in case the number of steps up to the destinating position is small from the beginning and a trigger signal 213 for lifting the ink ribbon 20 needs to be generated simultaneously with start of rotation of the rotor of step motor 5, the signal 213 is generated by the output of the AND gate 426. When the number of steps up to the destinating position is large and the acceleration-deceleration control is executed, the trigger signal 213 is generated by the output of the AND gate 424 in the midway of the acceleration-deceleration driving. And when both the repeat key 30 and the alpha-numeric key 26 are depressed simultaneously, the trigger signal 213 is generated by the output of the AND gate 431 which is synchronized with the clock pulse 449 in succession to the first driving of the print hammer 21. Subsequently, a trigger signal 214 for driving the print hammer 21 is generated with delay of a predetermined time by OM 445 and 446, and further a trigger signal 215 for effecting the spacing action is generated with delay of a predetermined time by OM 443 and 444 from generation of the trigger signal 214. During simultaneous depression of the repeat key 30 and the space bar 32, the space trigger signal 215 can be produced continuously by the output of the AND gate 437 synchronized with the clock pulses 449, and it can also be produced by the output of the AND gate 436 as well in response to depression of the space bar 32 alone. The trigger signals 213, 214 and 215 are fed to amplifiers (not shown) provided in the individual drive parts 210, 211 and 212 so as to energize the electromagnets 34, 22 and 61 related to the trigger signals respectively.

We claim:

1. In a step motor arrangement which drives a rotor member, said step motor arrangement having clock pulse means and pulse energizing means for energizing said step motor arrangement to various stages of energization, said rotor member having a defined home position, said step motor arrangement driving said rotor member stepwise one or a number of desired angular rotational steps from said home position to a desired stable last step position, where each step spans a predetermined angle, all of the step angles being equal, a step motor control system for accelerating the rotational speed of said rotor member during an acceleration phase as it turns from said home position to a point at least prior to one-half of the step angle before said last step position and decelerating the rotational speed of the rotor member during a deceleration phase for the remaining distance, as it travels to said desired last step position, and wherein information as to said last step position is provided by utilization means, said step motor control system comprising in combination:

(a) start-stop pulse means (300) coupled to the utilization means, said start-stop pulse means (300) generating a first pulse (328) to start the rotation of said step motor arrangement, said start-stop pulse means including one-shot means (200) and a pulse carrying circuit (201, 202, 203, 204) said pulse carying circuit being coupled to said step motor arrangement and providing an input drive pulse (206) and an initiating signal (207) to a gate (203) which permits a driving clock pulse signal (205) from the clock pulse means to drive the step motor arrangement;

(b) a detecting and signal giving circuit (6, 112) including a home position indicating circuit (113), said detecting and signal giving circuit detecting a plurality of angular step positions of said step motor arrangement and generating a position signal corresponding to each of said angular step positions, said detecting and signal giving circuit further including a shutter disc (**6*a*) so coupled to said step motor arrangement as to rotate with said rotor member (3), light emitting means (109*a*, 110*a*, 111*a*) disposed on one side of said shutter disc (6*a*) cooperating with light sensitive detection means (109, 110, 111) on the other side of said shutter disc (6*a*), with direction reading means (122, 124) providing clockwise and counter-clockwise direction-of-rotation signal information (119, 121, 123, 125**);

(c) an accelerate-decelerate circuit (115) coupled to said detecting and signal giving circuit (6, 112), said accelerate-decelerate circuit generating an acceleration-deceleration pulse signal (170) in response to the position signal at each of said step positions, said acceleration-deceleration pulse signal being given at least more than a half-step but less than one step of rotation before said last step position, said acceleration-deceleration circuit including a speed detector (117), said speed detector (117) receiving said direction-of rotation signal information outputs (119, 121, 123, 125);

(d) drive pulse means (216) including a control part (209) coupled for driving said step motor arrangement according to said first pulse (328) and said acceleration-deceleration pulse signal generated by said acceleration-deceleration circuit, said drive means (216) being coupled to said speed detector (117) receiving a signal (185) therefrom whose strength corresponds to the rotational speed of the rotor member at each step, said drive means (216) including a distributor (217), a deceleration-torque adding circuit (219) and a deceleration torque gate (221), said step motor arrangement having a plurality of windings, said distributor (217) being coupled thereto and providing a signal for energizing at least one of the windings for rotation, and deceleration torque gate (221) being also coupled to said wingings and supplying a flow of energizing force to windings other than the said one winding so as to apply a deceleration torque to the step motor arrangement;

(e) boundry position indicating means (290) coupled to said drive means (216) for indicating the boundry position between the acceleration phase and deceleration phase, including an up-down counter (257) to count the number of clockwise and counter-clockwise steps from the rotor member home position at each step, a compare circuit (259) coupled to said up-down counter (257) and receiving an input as to said last step position from the utilization means, an operating circuit (278) and a divider (279) computing the number of steps to some boundry which is the midpoint of the entire number of steps to go from the home position to the last position, said boundry position indicating means (290) providing a boundry pulse; and (f) pulse suppressing means (346) with gate means (362, 363, 364, 365, 366, 368, 369) said pulse suppressing means (346) being coupled to said boundry position indicating means (290) and to said driving means (216) for monitoring the feeding of drive pulses and also for suppressing one pulse of said acceleration-deceleration pulse signals in said boundry position so as to change the energization state of the step motor arrangement during the acceleration phase to a lower state of energization at a position at least more than a half step but less than one step before said stable last position and shifting the energization of the step motor arrangement during the deceleration phase to a lower state of energization, said pulse suppressing means (346) including a last signal forming circuit (282) triggered by said boundry pulse, and, said last signal forming circuit (282) supplying a last pulse (**218*k***).

* * * * *